United States Patent
Kurani

(10) Patent No.: US 10,997,592 B1
(45) Date of Patent: May 4, 2021

(54) MOBILE WALLET ACCOUNT BALANCE SYSTEMS AND METHODS

(71) Applicant: Wells Fargo Bank, N.A., San Francisco, CA (US)

(72) Inventor: Ashish Bhoopen Kurani, Burlingame, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 202 days.

(21) Appl. No.: 15/370,158

(22) Filed: Dec. 6, 2016

Related U.S. Application Data

(63) Continuation of application No. 14/553,756, filed on Nov. 25, 2014, which is a continuation-in-part of
(Continued)

(51) Int. Cl.
*G06Q 20/38* (2012.01)
*G06Q 20/36* (2012.01)
(Continued)

(52) U.S. Cl.
CPC ... *G06Q 20/3821* (2013.01); *G06K 19/06037* (2013.01); *G06Q 20/3221* (2013.01);
(Continued)

(58) Field of Classification Search
None
See application file for complete search history.

(56) References Cited

U.S. PATENT DOCUMENTS

| | | |
|---|---|---|
| 5,412,192 A | 5/1995 | Hoss |
| 5,778,067 A | 7/1998 | Jones et al. |

(Continued)

FOREIGN PATENT DOCUMENTS

| | | |
|---|---|---|
| WO | WO-2011/113121 A1 | 9/2011 |
| WO | WO-2012/139003 A2 | 10/2012 |

(Continued)

OTHER PUBLICATIONS

White, Ron, "How Computers Work", Que Publishing, 7th Ed, Oct. 15, 2003, p. 4. 23 pages.
(Continued)

*Primary Examiner* — Jacob C. Coppola
(74) *Attorney, Agent, or Firm* — Foley & Lardner LLP

(57) ABSTRACT

A system generates at least one of a customer token or device token configured to facilitate a mobile wallet transaction, transmits the customer token or device token to a server system for verification of the mobile wallet transaction, receives a screen display to present to the user, the screen display including the account balance information for the account held by the user at the financial institution, receives determination of rewards information regarding rewards available to the user if the user uses the account to perform the transaction, wherein the screen display comprises the rewards information, and provides an indication from the user that the user wishes to perform the mobile wallet transaction to transfer funds to a recipient, wherein the funds are transmitted to the recipient responsive to the provision of the indication from the user.

29 Claims, 22 Drawing Sheets

Related U.S. Application Data application No. 14/501,880, filed on Sep. 30, 2014, which is a continuation-in-part of application No. 14/266,580, filed on Apr. 30, 2014, now Pat. No. 9,652,770.

(51) Int. Cl.
  *G06Q 20/40* (2012.01)
  *G06K 19/06* (2006.01)
  *G06Q 20/32* (2012.01)

(52) U.S. Cl.
  CPC ....... *G06Q 20/3223* (2013.01); *G06Q 20/367* (2013.01); *G06Q 20/387* (2013.01); *G06Q 20/38215* (2013.01); *G06Q 20/409* (2013.01)

(56) References Cited

U.S. PATENT DOCUMENTS

| | | | |
|---|---|---|---|
| 6,016,484 A | 1/2000 | Williams et al. | |
| 6,018,724 A | 1/2000 | Arent | |
| 6,865,547 B1 | 3/2005 | Brake et al. | |
| 6,873,974 B1 | 3/2005 | Schutzer | |
| 7,822,206 B2 | 10/2010 | Birk et al. | |
| 7,827,057 B1 | 11/2010 | Walker et al. | |
| 7,909,243 B2 | 3/2011 | Merkow et al. | |
| 7,930,225 B2 | 4/2011 | Wahlberg et al. | |
| 7,945,776 B1* | 5/2011 | Atzmony | G06F 21/31 713/164 |
| 7,970,669 B1 | 6/2011 | Santos | |
| 8,019,365 B2 | 9/2011 | Fisher | |
| 8,078,140 B2 | 12/2011 | Baker et al. | |
| 8,126,806 B1 | 2/2012 | DiMartino et al. | |
| 8,160,959 B2 | 4/2012 | Rackley et al. | |
| 8,215,560 B2 | 7/2012 | Granucci et al. | |
| 8,280,788 B2 | 10/2012 | Perlman | |
| 8,332,290 B1 | 12/2012 | Venturo et al. | |
| 8,401,904 B1* | 3/2013 | Simakov | G06Q 20/40 705/16 |
| 8,433,657 B2 | 4/2013 | Dinan | |
| 8,452,257 B2 | 5/2013 | Granucci et al. | |
| 8,467,766 B2 | 6/2013 | Rackley et al. | |
| 8,468,587 B2 | 6/2013 | Blinn et al. | |
| 8,489,067 B2 | 7/2013 | Rackley, III et al. | |
| 8,504,699 B2 | 8/2013 | Vaughan et al. | |
| 8,533,123 B2 | 9/2013 | Hart | |
| 8,538,845 B2 | 9/2013 | Liberty | |
| 8,548,908 B2 | 10/2013 | Friedman | |
| 8,555,361 B2 | 10/2013 | Nakhjiri et al. | |
| 8,566,237 B2 | 10/2013 | Forzley | |
| 8,566,239 B2 | 10/2013 | Arthur et al. | |
| 8,615,468 B2 | 12/2013 | Varadarajan | |
| 8,627,424 B1 | 1/2014 | O'Malley et al. | |
| 8,639,621 B1 | 1/2014 | Ellis et al. | |
| 8,645,971 B2 | 2/2014 | Carlson et al. | |
| 8,676,704 B2 | 3/2014 | Ledbetter et al. | |
| 8,700,729 B2 | 4/2014 | Dua | |
| 8,706,628 B2 | 4/2014 | Phillips | |
| 8,725,576 B2 | 5/2014 | Fisher | |
| 8,725,577 B2 | 5/2014 | Fisher | |
| 8,732,080 B2 | 5/2014 | Karim | |
| 8,744,966 B1 | 6/2014 | Amacker et al. | |
| 8,750,901 B1 | 6/2014 | Gupta et al. | |
| 8,768,830 B1 | 7/2014 | Jorgensen et al. | |
| 8,768,834 B2 | 7/2014 | Zacarias et al. | |
| 8,774,781 B1 | 7/2014 | Speiser et al. | |
| 8,781,955 B2 | 7/2014 | Schamer et al. | |
| 8,831,677 B2 | 9/2014 | Villa-Real | |
| 8,838,501 B1 | 9/2014 | Priebatsch | |
| 8,843,125 B2 | 9/2014 | Kwon et al. | |
| 8,843,417 B2 | 9/2014 | Hammad | |
| 8,880,432 B2 | 11/2014 | Collins, Jr. | |
| 8,924,246 B1 | 12/2014 | Chen et al. | |
| 8,925,805 B2 | 1/2015 | Grigg et al. | |
| 8,972,297 B2 | 3/2015 | Kay et al. | |
| 8,977,251 B2 | 3/2015 | Grigg et al. | |
| 8,989,712 B2 | 3/2015 | Wentker et al. | |
| 9,020,836 B2 | 4/2015 | Fisher et al. | |
| 9,026,460 B2 | 5/2015 | Grigg et al. | |
| 9,027,109 B2 | 5/2015 | Wolberg-Stok et al. | |
| 9,037,509 B1 | 5/2015 | Ellis et al. | |
| 9,043,240 B2 | 5/2015 | Langus et al. | |
| 9,098,190 B2 | 8/2015 | Zhou et al. | |
| 9,177,307 B2 | 11/2015 | Ross et al. | |
| 9,208,488 B2 | 12/2015 | Liberty | |
| 9,218,624 B2 | 12/2015 | Moghadam | |
| 9,256,876 B2 | 2/2016 | Vasant Akole et al. | |
| 9,286,606 B2 | 3/2016 | Diamond | |
| 9,324,068 B2 | 4/2016 | Soundararajan | |
| 9,361,616 B2 | 6/2016 | Zhou et al. | |
| 9,652,770 B1 | 5/2017 | Kurani et al. | |
| 9,691,058 B2 | 6/2017 | Epler et al. | |
| 9,741,051 B2 | 8/2017 | Carpenter et al. | |
| 9,805,363 B1 | 10/2017 | Rudnick et al. | |
| 9,972,047 B1 | 5/2018 | Elliott | |
| 10,140,615 B2 | 11/2018 | Carpenter et al. | |
| 10,169,812 B1 | 1/2019 | Bajgier et al. | |
| 10,515,356 B2 | 12/2019 | Cronic et al. | |
| 2002/0032602 A1 | 3/2002 | Lanzillo et al. | |
| 2003/0028481 A1 | 2/2003 | Flitcroft et al. | |
| 2003/0040964 A1 | 2/2003 | Lacek | |
| 2003/0055785 A1 | 3/2003 | Lahiri | |
| 2003/0056096 A1* | 3/2003 | Albert | G06F 21/31 713/168 |
| 2004/0230535 A1 | 11/2004 | Binder et al. | |
| 2004/0236632 A1* | 11/2004 | Maritzen | G06Q 20/02 705/26.1 |
| 2004/0260646 A1 | 12/2004 | Berardi et al. | |
| 2005/0021401 A1 | 1/2005 | Postrel | |
| 2005/0043997 A1 | 2/2005 | Sahota et al. | |
| 2005/0086492 A1* | 4/2005 | Nicodemus | H04L 9/3271 713/182 |
| 2005/0138377 A1* | 6/2005 | First | G06F 21/305 713/169 |
| 2005/0184145 A1 | 8/2005 | Law et al. | |
| 2005/0235363 A1* | 10/2005 | Hibbard | H04L 63/0428 726/28 |
| 2006/0235795 A1* | 10/2006 | Johnson | G06Q 20/02 705/44 |
| 2006/0253335 A1 | 11/2006 | Keena et al. | |
| 2007/0170243 A1 | 7/2007 | Desany et al. | |
| 2007/0174873 A1 | 7/2007 | Griggs | |
| 2007/0198432 A1 | 8/2007 | Pitroda | |
| 2007/0244811 A1 | 10/2007 | Tumminaro | |
| 2008/0006685 A1 | 1/2008 | Rackley, III et al. | |
| 2008/0033878 A1 | 2/2008 | Krikorian et al. | |
| 2008/0127317 A1* | 5/2008 | Nakhjiri | H04L 63/06 726/6 |
| 2008/0203152 A1 | 8/2008 | Hammad et al. | |
| 2008/0208742 A1 | 8/2008 | Arthur | |
| 2008/0242274 A1 | 10/2008 | Swanburg et al. | |
| 2008/0243701 A1 | 10/2008 | Von Mueller | |
| 2008/0319887 A1 | 12/2008 | Pizzi et al. | |
| 2009/0048971 A1 | 2/2009 | Hathaway et al. | |
| 2009/0157531 A1 | 6/2009 | Bui | |
| 2009/0177563 A1 | 7/2009 | Bernstein et al. | |
| 2009/0228966 A1 | 9/2009 | Parfene et al. | |
| 2009/0271287 A1 | 10/2009 | Halpern | |
| 2009/0319427 A1 | 12/2009 | Gardner et al. | |
| 2010/0082481 A1 | 4/2010 | Lin et al. | |
| 2010/0114724 A1 | 5/2010 | Ghosh et al. | |
| 2010/0114731 A1 | 5/2010 | Kingston et al. | |
| 2010/0114733 A1 | 5/2010 | Collas et al. | |
| 2010/0125495 A1 | 5/2010 | Smith et al. | |
| 2010/0125510 A1 | 5/2010 | Smith et al. | |
| 2010/0191602 A1 | 7/2010 | Mikkelsen et al. | |
| 2010/0205077 A1 | 8/2010 | Hammad | |
| 2011/0055080 A1 | 3/2011 | Ahlers et al. | |
| 2011/0106674 A1 | 5/2011 | Perlman | |
| 2011/0137797 A1 | 6/2011 | Stals et al. | |
| 2011/0154466 A1 | 6/2011 | Harper et al. | |
| 2011/0191160 A1 | 8/2011 | Blackhurst et al. | |
| 2011/0196782 A1 | 8/2011 | Allen et al. | |

(56) References Cited

U.S. PATENT DOCUMENTS

| | | | |
|---|---|---|---|
| 2011/0251892 A1* | 10/2011 | Laracey | G06Q 20/20 705/14.51 |
| 2011/0270748 A1 | 11/2011 | Graham et al. | |
| 2011/0289004 A1 | 11/2011 | Prakash et al. | |
| 2011/0295748 A1 | 12/2011 | Woodriffe | |
| 2011/0313918 A1 | 12/2011 | Lawson et al. | |
| 2012/0011063 A1 | 1/2012 | Killian et al. | |
| 2012/0018511 A1 | 1/2012 | Hammad | |
| 2012/0078735 A1 | 3/2012 | Bauer et al. | |
| 2012/0078751 A1 | 3/2012 | MacPhail et al. | |
| 2012/0084210 A1 | 4/2012 | Farahmand | |
| 2012/0110634 A1 | 5/2012 | Jakobsson | |
| 2012/0130731 A1 | 5/2012 | Canetto | |
| 2012/0143705 A1 | 6/2012 | Bhattacharya et al. | |
| 2012/0150669 A1 | 6/2012 | Langley et al. | |
| 2012/0150687 A1 | 6/2012 | Hart | |
| 2012/0158589 A1 | 6/2012 | Katzin et al. | |
| 2012/0185317 A1 | 7/2012 | Wong | |
| 2012/0185387 A1 | 7/2012 | Doyle | |
| 2012/0192254 A1 | 7/2012 | Garcia Perez et al. | |
| 2012/0196586 A1 | 8/2012 | Grigg et al. | |
| 2012/0197793 A1 | 8/2012 | Grigg et al. | |
| 2012/0197794 A1 | 8/2012 | Grigg et al. | |
| 2012/0209749 A1 | 8/2012 | Hammad et al. | |
| 2012/0239417 A1 | 9/2012 | Pourfallah et al. | |
| 2012/0253852 A1 | 10/2012 | Pourfallah et al. | |
| 2012/0254021 A1 | 10/2012 | Wohied et al. | |
| 2012/0271705 A1* | 10/2012 | Postrel | G06Q 20/201 705/14.33 |
| 2012/0284130 A1 | 11/2012 | Lewis et al. | |
| 2012/0290376 A1 | 11/2012 | Dryer et al. | |
| 2012/0296720 A1 | 11/2012 | Pirillo | |
| 2012/0303425 A1 | 11/2012 | Katzin et al. | |
| 2012/0310774 A1 | 12/2012 | Chassin | |
| 2012/0323762 A1 | 12/2012 | Kapur et al. | |
| 2012/0330837 A1 | 12/2012 | Persaud et al. | |
| 2013/0006848 A1 | 1/2013 | Kuttuva | |
| 2013/0018777 A1 | 1/2013 | Klein | |
| 2013/0018792 A1 | 1/2013 | Casey et al. | |
| 2013/0030941 A1 | 1/2013 | Meredith et al. | |
| 2013/0042261 A1 | 2/2013 | Tavormina et al. | |
| 2013/0054454 A1 | 2/2013 | Purves et al. | |
| 2013/0060679 A1 | 3/2013 | Oskolkov et al. | |
| 2013/0060696 A1 | 3/2013 | Martin et al. | |
| 2013/0060708 A1 | 3/2013 | Oskolkov et al. | |
| 2013/0065555 A1 | 3/2013 | Baker et al. | |
| 2013/0073365 A1 | 3/2013 | McCarthy | |
| 2013/0073459 A1 | 3/2013 | Zacarias et al. | |
| 2013/0080241 A1 | 3/2013 | Fisher | |
| 2013/0110658 A1 | 5/2013 | Lyman et al. | |
| 2013/0132854 A1 | 5/2013 | Raleigh et al. | |
| 2013/0144663 A1 | 6/2013 | Qawami et al. | |
| 2013/0151400 A1 | 6/2013 | Makhotin et al. | |
| 2013/0166332 A1 | 6/2013 | Hammad | |
| 2013/0185167 A1 | 7/2013 | Mestre et al. | |
| 2013/0191227 A1 | 7/2013 | Pasa et al. | |
| 2013/0191277 A1 | 7/2013 | O'Leary et al. | |
| 2013/0191278 A1 | 7/2013 | O'Leary et al. | |
| 2013/0200999 A1 | 8/2013 | Spodak et al. | |
| 2013/0204785 A1 | 8/2013 | Monk et al. | |
| 2013/0226751 A1 | 8/2013 | Friedholm et al. | |
| 2013/0226799 A1 | 8/2013 | Raj | |
| 2013/0232032 A1 | 9/2013 | Chaturvedi et al. | |
| 2013/0238455 A1* | 9/2013 | Laracey | G06Q 20/20 705/21 |
| 2013/0246258 A1 | 9/2013 | Dessert | |
| 2013/0246260 A1 | 9/2013 | Barten et al. | |
| 2013/0246261 A1 | 9/2013 | Purves et al. | |
| 2013/0246265 A1 | 9/2013 | Al-Sahli | |
| 2013/0254102 A1 | 9/2013 | Royyuru | |
| 2013/0260734 A1 | 10/2013 | Jain et al. | |
| 2013/0262309 A1 | 10/2013 | Gadotti | |
| 2013/0262316 A1 | 10/2013 | Hruska | |
| 2013/0282588 A1* | 10/2013 | Hruska | G06Q 20/40 705/67 |
| 2013/0290121 A1* | 10/2013 | Simakov | G06Q 20/40 705/21 |
| 2013/0290169 A1 | 10/2013 | Bathula et al. | |
| 2013/0297513 A1 | 11/2013 | Kirillin et al. | |
| 2013/0317928 A1 | 11/2013 | Laracey | |
| 2013/0332344 A1 | 12/2013 | Weber | |
| 2013/0332353 A1 | 12/2013 | Aidasani et al. | |
| 2014/0006129 A1 | 1/2014 | Heath | |
| 2014/0006276 A1 | 1/2014 | Grigg et al. | |
| 2014/0012750 A1 | 1/2014 | Kuhn et al. | |
| 2014/0019352 A1 | 1/2014 | Shrivastava | |
| 2014/0019360 A1 | 1/2014 | Yang | |
| 2014/0038546 A1 | 2/2014 | Neal et al. | |
| 2014/0058855 A1 | 2/2014 | Hussein et al. | |
| 2014/0058936 A1 | 2/2014 | Ren et al. | |
| 2014/0074655 A1 | 3/2014 | Lim et al. | |
| 2014/0074724 A1 | 3/2014 | Gordon et al. | |
| 2014/0081783 A1 | 3/2014 | Paranjape et al. | |
| 2014/0081854 A1 | 3/2014 | Sanchez et al. | |
| 2014/0089171 A1 | 3/2014 | Gandhi | |
| 2014/0096215 A1 | 4/2014 | Hessler | |
| 2014/0100975 A1 | 4/2014 | Van | |
| 2014/0101048 A1 | 4/2014 | Gardiner et al. | |
| 2014/0108254 A1 | 4/2014 | Lee | |
| 2014/0114856 A1 | 4/2014 | Jung et al. | |
| 2014/0122310 A1 | 5/2014 | Torrens et al. | |
| 2014/0122563 A1 | 5/2014 | Singh et al. | |
| 2014/0129357 A1 | 5/2014 | Goodwin | |
| 2014/0129442 A1 | 5/2014 | Hanson et al. | |
| 2014/0136352 A1 | 5/2014 | Ramakrishna et al. | |
| 2014/0180849 A1* | 6/2014 | Kimberg | G06Q 20/384 705/16 |
| 2014/0188718 A1 | 7/2014 | Grossman et al. | |
| 2014/0188719 A1 | 7/2014 | Poornachandran et al. | |
| 2014/0207680 A1 | 7/2014 | Rephlo | |
| 2014/0214640 A1 | 7/2014 | Mallikarjunan et al. | |
| 2014/0222670 A1 | 8/2014 | Concannon | |
| 2014/0244506 A1 | 8/2014 | Gramling | |
| 2014/0250003 A1 | 9/2014 | Levchin et al. | |
| 2014/0258135 A1 | 9/2014 | Park et al. | |
| 2014/0279097 A1 | 9/2014 | Alshobaki et al. | |
| 2014/0279469 A1 | 9/2014 | Mendes | |
| 2014/0279489 A1 | 9/2014 | Russell et al. | |
| 2014/0279566 A1 | 9/2014 | Verma et al. | |
| 2014/0282068 A1 | 9/2014 | Levkovitz et al. | |
| 2014/0297435 A1 | 10/2014 | Wong | |
| 2014/0297520 A1 | 10/2014 | Levchin et al. | |
| 2014/0297524 A1 | 10/2014 | Ravindranath et al. | |
| 2014/0304095 A1 | 10/2014 | Fisher | |
| 2014/0310173 A1 | 10/2014 | Caldwell | |
| 2014/0310182 A1 | 10/2014 | Cummins | |
| 2014/0337175 A1 | 11/2014 | Katzin et al. | |
| 2014/0344153 A1 | 11/2014 | Raj et al. | |
| 2014/0347265 A1 | 11/2014 | Aimone et al. | |
| 2014/0351072 A1 | 11/2014 | Wieler et al. | |
| 2014/0351126 A1 | 11/2014 | Priebatsch | |
| 2014/0351130 A1 | 11/2014 | Cheek et al. | |
| 2014/0365363 A1 | 12/2014 | Knudsen et al. | |
| 2014/0376576 A1 | 12/2014 | Jespersen et al. | |
| 2014/0379576 A1 | 12/2014 | Marx et al. | |
| 2015/0019944 A1 | 1/2015 | Kalgi | |
| 2015/0026049 A1 | 1/2015 | Theurer et al. | |
| 2015/0032626 A1 | 1/2015 | Dill et al. | |
| 2015/0032627 A1 | 1/2015 | Dill et al. | |
| 2015/0035643 A1 | 2/2015 | Kursun | |
| 2015/0046241 A1* | 2/2015 | Salmon | G06Q 30/0216 705/14.18 |
| 2015/0046339 A1 | 2/2015 | Wong et al. | |
| 2015/0074774 A1 | 3/2015 | Nema et al. | |
| 2015/0088633 A1* | 3/2015 | Salmon | G06Q 20/227 705/14.33 |
| 2015/0089568 A1 | 3/2015 | Sprague et al. | |
| 2015/0095075 A1 | 4/2015 | Breuer et al. | |
| 2015/0095219 A1 | 4/2015 | Hurley | |
| 2015/0100442 A1 | 4/2015 | Van Heerden et al. | |
| 2015/0112781 A1 | 4/2015 | Clark et al. | |
| 2015/0134540 A1 | 5/2015 | Law et al. | |
| 2015/0137938 A1 | 5/2015 | Slaby et al. | |
| 2015/0140960 A1 | 5/2015 | Powell et al. | |

(56) References Cited

U.S. PATENT DOCUMENTS

| | | |
|---|---|---|
| 2015/0154588 A1 | 6/2015 | Purves et al. |
| 2015/0178693 A1 | 6/2015 | Solis |
| 2015/0186875 A1 | 7/2015 | Zhang et al. |
| 2015/0186886 A1 | 7/2015 | Schwalb et al. |
| 2015/0187021 A1 | 7/2015 | Moring et al. |
| 2015/0193869 A1 | 7/2015 | Del Vecchio et al. |
| 2015/0220914 A1 | 8/2015 | Purves et al. |
| 2015/0229622 A1 | 8/2015 | Grigg et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0287015 A1 | 10/2015 | Kaplinger et al. |
| 2015/0287037 A1 | 10/2015 | Salmon et al. |
| 2015/0319158 A1* | 11/2015 | Kumnick .............. H04L 63/083 726/9 |
| 2015/0324768 A1 | 11/2015 | Filter et al. |
| 2015/0332252 A1 | 11/2015 | Shahrokhi et al. |
| 2015/0339662 A1 | 11/2015 | Huang et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0063496 A1 | 3/2016 | Royyuru et al. |
| 2016/0065370 A1* | 3/2016 | Le Saint ............... H04L 9/0891 713/155 |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0140555 A1 | 5/2016 | Scipioni |
| 2016/0162889 A1 | 6/2016 | Badenhorst |
| 2016/0342992 A1 | 11/2016 | Lee |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0193468 A1 | 7/2017 | Chougule et al. |
| 2018/0007052 A1 | 1/2018 | Quentin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0365675 A1 | 12/2018 | Sivaraman |
| 2018/0374076 A1 | 12/2018 | Wheeler |
| 2019/0304029 A1 | 10/2019 | Murray et al. |

FOREIGN PATENT DOCUMENTS

| | | | |
|---|---|---|---|
| WO | WO-2013/079793 A1 | 6/2013 | |
| WO | WO-2014012138 A1 * | 1/2014 | .......... G06Q 20/387 |
| WO | WO-2014/111888 A1 | 7/2014 | |
| WO | WO-2014/207615 A1 | 12/2014 | |
| WO | WO-2015/023172 A2 | 2/2015 | |
| WO | WO-2015016780 A1 * | 2/2015 | .......... G06Q 30/0207 |
| WO | WO-2016/009198 A1 | 1/2016 | |
| WO | WO-2016/053975 A1 | 4/2016 | |
| WO | WO-2016/097879 A1 | 6/2016 | |
| WO | WO-2016/172107 A1 | 10/2016 | |
| WO | WO-2016/196054 A1 | 12/2016 | |

OTHER PUBLICATIONS

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

Smart Card Alliance, "The Mobile Payments and NFC Landscape: A U.S. Perspective," Sep. 2011. 53 pages.

How to Control Children's Spending on Debit Cards | Money | by Jill Paperworth, May 10, 2009, https:www.theguardian.com/money/2009/mar/ . . . /children-debit-cards-online-spend . . . (Year: 2009).

EMV, "Payment Tokenisation Specification Technical Framework", 2014 EMVCO, LLC. 84 pages.

* cited by examiner

| | | | | | | | | | | | | | | | | | | | | | | | | | | | | | | | | | | | Positions |
|---|---|---|---|---|---|---|---|---|---|---|---|---|---|---|---|---|---|---|---|---|---|---|---|---|---|---|---|---|---|---|---|---|---|---|---|
| 1 | 2 | 3 | ... | 6 | ... | 8 | 9 | ... | 14 | 15 | 16 | 17 | 18 | 19 | 20 | 21 | 22 | 23 | ... | 32 | 33 | 34 | 35 | 36 | 37 | 38 | 39 | 40 | 41 | 42 | 43 | ... | 49 | 50 | 51 | ... | 73 | 74 | 75 | 76 |
| 1 | 1 | 2 | ... | 6 | ... | 7 | 8 | ... | 14 | 15 | 16 | 17 | 18 | 19 | 1 | 1 | 2 | ... | 11 | 12 | 1 | 1 | 2 | 3 | 4 | 1 | 2 | 3 | 1 | 2 | ... | 8 | 9 | 10 | ... | 32 | 33 | 34 | 35 |
| Format Code (FC) | Tokenized Primary Account Number (TPAN) | | | | | | | | | | | | | | | Field Separator (FS) | Customer Name | | | | | Field Separator (FS) | Expiration Date (ED) | | | | Service Code (SC) | | | Payment Token (WFPT) | | | | | | | | | | Field |
| B | Variable | | | | | | | | | | | | | | | < | Variable | | | | | < | Variable | | | | 171 | | | Variable | | | | | | | | | | Content |
| Indicates the card type | Numeric; generated by Mobile Wallet server | | | | | | | | | | | | | | | Delimiter | Customer Name. Format will be LastName, FirstName (Ex. Robert Forrestor will be displayed as "Forre, Rober" | | | | | Delimiter | Format YYMM. where YYMM is a random number generated per the rule YY >15 & <=99 MM >=01 & <=12 | | | | Default Value. | | | Alphanumeric; generated by Mobile Wallet server | | | | | | | | | | Description |
| Char | Numeric | | | | | | | | | | | | | | | Char | String | | | | | Char | Numeric | | | | Numeric | | | String | | | | | | | | | | Type |

FIG. 5

| Positions | | | | | | | | | | | | | | | | | | | | | | | | | | | | | | | | | | | | | | Field | Content | Description | Type |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | | | | |
| 1 | 1 | 2 | 3 | 4 | 5 | 6 | 7 | 8 | 9 | 10 | 11 | 12 | 13 | 14 | 15 | 16 | 17 | 18 | 19 | 1 | 1 | 2 | 3 | 4 | 1 | 2 | 3 | 1 | 2 | 3 | 4 | 5 | 6 | 7 | 8 | 9 | 10 | | | | |
| Format Code (FC) | | | colspan="19" | Tokenized Primary Account Number (TPAN) | | | | | | | | | | | | | | | | Field Separator (FS) | Expiration Date (ED) | | | | Service Code (SC) | | | Payment Token (WFPT) Subset that includes the prefix. | | | | | | | | | | | | |
| :: | | | | Variable | | | | | | | | | | | | | | | | = | Variable | | | | 171 | | | Variable | | | | | | | | | | | | | |
| Indicates the card type | | | | All Numeric values; generated by Mobile Wallet server | | | | | | | | | | | | | | | | Delimiter | Format YYMM where YYMM is a random number generated per the rule YY >15 & <=99 MM >=01 & <=12 | | | | Default Value. | | | All Numeric values; generated by Mobile Wallet server | | | | | | | | | | | | |
| Hex B | | | | Numeric | | | | | | | | | | | | | | | | Hex D | Numeric | | | | Numeric | | | Numeric | | | | | | | | | | | | |

Payment Code Track 2

FIG. 6

| Wallet Representation of Primary Account Number | | | | | | | | | | | | | | | | | | | Positions |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | Positions |
| IIN | | | | | | Trace ID | | | | | | | | Pseudo Check Digit | Last4 | | | | Field |
| Unique IIN | | | | | | Unique random numeric value. Will be used to validate transaction | | | | | | | | Luhn factor to calculate Check digit | Last 4 digits of Default Payment Type - Last digitis Check digit | | | | Description |
| Numeric | | | | | | Numeric | | | | | | | | | Numeric | | | | Type |
| Tokenized PAN | | | | | | | | | | | | | | | | | | | |

FIG. 7

| Track 2 of Actual Card Number with Trace ID embedded | | | | | | | | | | | | | | | | | | | | | | | | | | | | | | | | | | | | | | Field | Content | Description | Type |
|---|---|---|---|---|---|---|---|---|---|---|---|---|---|---|---|---|---|---|---|---|---|---|---|---|---|---|---|---|---|---|---|---|---|---|---|---|---|---|---|---|---|
| Positions | | | | | | | | | | | | | | | | | | | | | | | | | | | | | | | | | | | | | | | | | |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | | | | |
| 1 | 1 | 2 | 3 | 4 | 5 | 6 | 7 | 8 | 9 | 10 | 11 | 12 | 13 | 14 | 15 | 16 | 1 | 1 | 2 | 3 | 4 | 1 | 2 | 3 | 1 | 2 | 3 | 4 | 5 | 6 | 7 | 8 | 1 | 1 | 2 | 3 | 4 | | | | |
| Format Code (FC) | Card Number (PAN) (Debit or Credit) | | | | | | | | | | | | | | | | Field Separator (FS) | Expiration Date (ED) | | | | Service Code (SC) | | | Trace Id | | | | | | | | Offline QR Flag | | | | | | | |
| 1 | Variable | | | | | | | | | | | | | | | | 1 | Variable | | | | 520 | | | Variable | | | | | | | | 1 | | | | | | | | |
| Indicates the card type | Customer's Payment Type configured in Mobile Wallet | | | | | | | | | | | | | | | | Delimiter | Format YYMM Card Expiration Date | | | | Default Value. | | | Trace Id from the TPAN | | | | | | | | 0 if online, 1 if offline | | | | | | | |
| Hex B | Numeric | | | | | | | | | | | | | | | | Hex D | Numeric | | | | Numeric | | | Numeric | | | | | | | | Numeric | | | | | | | |

MOBILE WALLET ACCOUNT BALANCE SYSTEMS AND METHODS

CROSS-REFERENCE TO RELATED APPLICATIONS

This application is a continuation of U.S. patent application Ser. No. 14/553,756 filed Nov. 25, 2014, entitled "Mobile Wallet Account Balance Systems and Methods", which is a continuation-in-part of U.S. patent application Ser. No. 14/501,880, filed Sep. 30, 2014, entitled "Mobile Wallet Account Provisioning Systems and Methods," which is a continuation-in-part of U.S. patent application Ser. No. 14/266,580, filed Apr. 30, 2014, entitled "Mobile Wallet Using Tokenized Card Systems and Methods," all of which are incorporated by reference herein in their entireties.

BACKGROUND

The present disclosure relates generally to the field of systems that use mobile devices to transfer funds. More specifically, the present disclosure relates to systems and methods for enabling individuals to use their electronic devices to transfer funds, purchase products and services.

Payments for products and services are often completed using credit cards, debit cards, checks, or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless Internet connection. A person may wish to make payments to merchants or other individuals using these mobile devices. Likewise, a person may wish to transfer funds to other individuals using their mobile devices. Enhanced systems and methods of facilitating such transactions would be desirable.

SUMMARY

According to one example embodiment, a system generates at least one of a customer token or device token configured to facilitate a mobile wallet transaction. The system transmits the customer token or device token to a server system for verification of the mobile wallet transaction. The system receives a screen display to present to the user. The screen display includes the account balance information for the account held by the user at the financial institution. The system receives, by a mobile device via a computer system, a determination of rewards information regarding rewards available to the user if the user uses the account to perform the transaction. The screen display comprises the rewards information. The system provides an indication from the user that the user wishes to perform the mobile wallet transaction to transfer funds to a recipient. The funds are transmitted to the recipient responsive to the provision of the indication from the user.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 5 illustrates a Track 1 format for a generated QR code that may be created in the token generation process, according to an example embodiment.

FIG. 6 illustrates a Track 2 format for a generated QR code that may be created in the token generation process, according to an example embodiment.

FIG. 7 illustrates a tokenized primary account number (TPAN) format within the QR code of FIGS. 5-6, according to an example embodiment.

FIG. 8 illustrates a Track 2 format for a code generated, according to an example embodiment.

DETAILED DESCRIPTION

Figure 1:
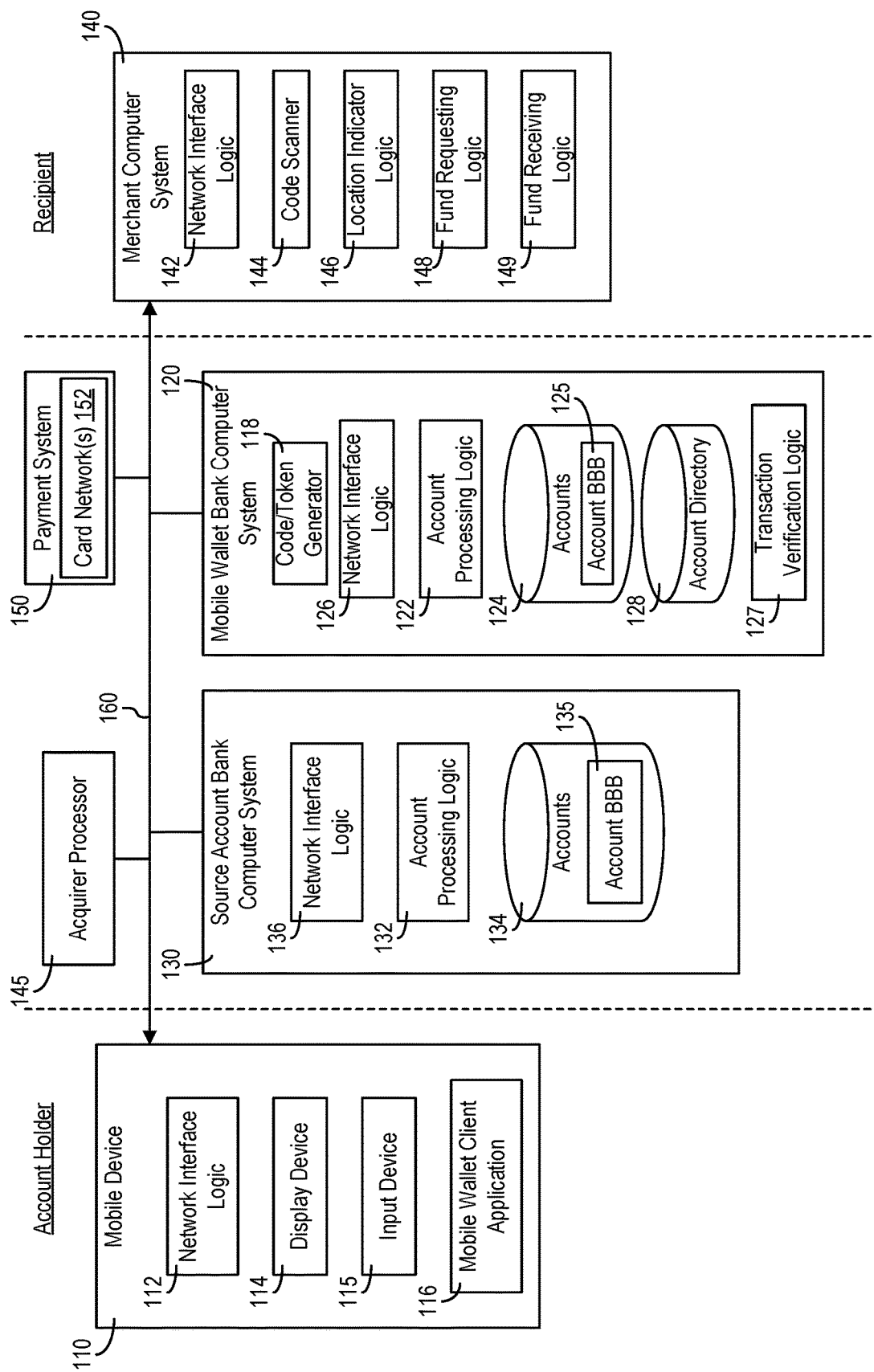
FIG. 1 is a block diagram of a computer-implemented payment processing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing token generation and validation features for a payment processing system are described. More particularly, the present disclosure relates to the use of codes with tokens for validation during payment processing. The codes may be transmitted, e.g., using optical image methods (e.g., QR code), NFC, wireless, Bluetooth, low energy Bluetooth, RFID, hypersonic, Wi-Fi, cellular 3G, 4G, GSM, LiFi, etc. The systems and methods described herein may be implemented for users having a mobile wallet implemented on a mobile device. The mobile wallet allows the user access to accounts via the mobile device to provide payments to merchants or other users. The systems and methods described herein allow for integration between a mobile wallet server and a merchant for processing a payment.

In an embodiment of the present disclosure, a code representing a substitute card number may be generated and formatted for use as part of a validation system. When a user registers for a mobile wallet account, a customer token may be generated for the user and a device token may be generated for the device used by the user. The customer token and device token may be used to verify further transactions between the user and the mobile banking system or mobile wallet account.

When the user logs into his or her mobile wallet and wishes to make a payment using funds in the user's accounts, the customer token and device token are sent or provided to a server system. A substitute card number (tokenized) including a trace ID number as described below may be provided to the user by a mobile wallet computer system. The mobile wallet computer system and a point of sale (POS) device, e.g., at the store location at which the payment is to be submitted, use the substitute credit card number to authenticate the transaction. The substitute card number may be formatted to include a portion of an actual card number held by the user, e.g., so that the last four digits appearing on a receipt provided to the user match those of the user's actual card number, even though a substitute card number was provided to the merchant to process the payment.

In various embodiments, the substitute card number (tokenized) including a trace ID number as described below may be converted back into the actual credit card number by a mobile wallet computer system. For example, the merchant point of sale device may provide the substitute card number to the mobile wallet computer system. In response, and after authenticating the transaction, the mobile wallet computer system may return the actual card number to the merchant computer system. The merchant computer system may then provide the actual card number to an acquirer processor computer system, which in turn may provide the actual card number a payment network, which in turn may provide the card number to a source account (credit card issuer) computer system for payment processing. Such embodiments facilitate processing of rewards points and other rewards information at the point of sale.

In other embodiments, the merchant point of sale device may provide the substitute card number to an acquirer processor computer system, which in turn may provide the substitute card number to the mobile wallet computer system. In response, and after authenticating the transaction, the mobile wallet computer system may return the actual card number to the acquirer processor computer system. The acquirer processor may then provide the actual card number to a payment network, which in turn may provide the card number to a source account (credit card issuer) computer system for payment processing.

In other embodiments, rather than providing the substitute card number to the mobile wallet computer system, the acquirer processor computer system may provide the substitute card number to a payment network computer system. In turn, the payment network computer system may provide the substitute card number to the mobile wallet computer system, which, after authenticating the transaction, may then return the actual card number to the payment network computer system. The payment network computer system may then provide the actual card number to a source account computer system for payment processing.

Referring to FIG. 1, a computer-implemented payment processing system 100 is shown, according to an example embodiment. The payment processing system 100 may be used to set up and utilize a mobile wallet. The user may be a business entity and/or an individual consumer that has one or more source accounts with a financial institution. The source accounts may include business or consumer demand deposit, credit card, debit card accounts, lines of credit, and so on. The mobile wallet account may be created for the user to transmit funds from a source account to pay for goods or services to a merchant. Additionally, funds can be transferred from the source account to another person.

The payment processing system 100 may include, among other systems, a mobile device 110, a mobile wallet bank computer system 120, a source account bank computer system 130, a merchant computer system 140, an acquirer/processor computer system 145 and a payment system 150. The various systems may communicate through a network 160, which may include one or more of the Internet, cellular network, Wi-Fi, Wi-Max, a proprietary banking network, or any other type of wired or wireless network. In some embodiments, the mobile wallet bank computer system 120 and source account bank computer system 130 may be owned by the same entity. In other embodiments, the mobile wallet bank computer system 120 and source account bank computer system 130 may be owned by a different entity.

The mobile wallet bank computer system 120, the source account bank computer system 130, the acquirer/processor computer system 145 and the payment system 150 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, non-transitory computer storage media. The memory may include data base components, object code components, script components, or any other type of information structure for supporting the various activities and information structures described herein. The memory may be communicably connected to the processor and include computer code or instructions for executing one or more processes described herein.

The mobile wallet account may be established in a variety of ways, for example, through an online banking area of a website of the banking institution that operates the mobile wallet bank computer system 120.

The mobile device 110 may be used by an individual user (e.g., a business owner or employee, a consumer, etc.) to create and interact with a mobile wallet account. The mobile device 110 may, for example be, a cellular phone, smart phone, mobile handheld wireless e-mail device, personal digital assistant, portable gaming device, or other suitable device. The mobile device 110 includes a network interface logic 112, a display device 114, an input device 115, and a mobile wallet client application 116. The network interface logic 112 may include, for example, program logic that connects the mobile device 110 to the network 160. For example, the mobile device 110 may receive and display screens including account information, transaction instructions, and so on. In one embodiment, a screen may be used to request a username and password information from the user, to prompt the user to provide information regarding the amount of a payment and which merchant or individual (e.g., name, address, phone number or e-mail, a selection of a recipient by the user from his/her memory or from the mobile device 110, etc.) is to receive the payment. Such screens are presented to the user via the display device 114. The input device 115 may be used to permit the user to initiate account access and to facilitate receiving requested information from the user. The input device 115 may include, for example, a keypad or keyboard, a touchscreen, a microphone, or any other device that allows the user to access the payment processing system 100. As will be appreciated, in addition to or instead of the mobile device 110, users may also be provided with the ability to access the payment processing system 100 using another type of computer (e.g., a desktop or laptop computer executing browser software) to perform the operations described herein as being performed by the mobile device 110.

The mobile wallet client application 116 or mobile wallet circuit may include program logic executable by mobile device 110 to implement at least some of the functions described herein. In order to make the mobile wallet circuit 116, the mobile wallet bank computer system 120 may provide a software application and make the software application available to be placed on the mobile device 110. For example, the mobile wallet bank computer system 120 may make the software application available to be downloaded (e.g., via the online banking website of the mobile wallet bank, via an app store, or in another manner). Responsive to a user selection of an appropriate link, the mobile wallet application may be transmitted to the mobile device and may cause itself to be installed on the mobile device 110. Installation of the software application creates the mobile wallet circuit on the mobile device 110. Specifically, after installation, the thus-modified mobile device 110 includes the mobile wallet circuit (embodied as a processor and instructions stored in non-transitory memory that are executed by the processor).

As will be appreciated, the level of functionality that resides on the mobile device 110 as opposed to the mobile wallet bank computer system 120 may vary depending on the implementation. The client application 116 may provide an interface that is configured to receive and display mobile web pages received from the mobile wallet bank computer system 120 (e.g., web pages prompting the user to provide information to create an account, web pages displaying account balance information and past transactions, and so on). Upon initiation of a transaction, the client application 116 may request data from the mobile wallet computer system 120 to generate a unique code/token. The unique code/token may then be transmitted by the mobile device 110 to the merchant computer system 140 as part of a transaction to facilitate authentication of the transaction. In other embodiments, the mobile wallet bank computer system 120 may implement the code/token generator.

The mobile wallet client application 116 is used in connection with merchant computer system 140 located at a brick and mortar store location. Additionally, the mobile wallet application 116 may also be used in connection with online merchant transactions. In another embodiment, merchants may be provided with the ability to have a mobile storefront and profile within the mobile wallet client application 116. For example, merchants may be provided with the ability to display marketing material, provide information, and promote products or discounts. Merchants may also be provided with the ability to sell items directly through their mobile storefront for the account holder to purchase from within the mobile wallet client application 116.

The mobile wallet client application 116 may offer a user to choose any one of the accounts for transferring funds to the merchant for goods or services. An account holder may select a default account that is used to make payments. The account holder may use account selection logic to select the account the account holder wants to use to pay the merchant or other recipient.

The mobile wallet bank computer system 120 includes code/token generator 118, account processing logic 122, an accounts database 124, network interface logic 126, transaction verification logic 127, and an account directory 128. In one embodiment, the mobile wallet bank computer system 120 is operated by a first banking entity that maintains and handles transaction processing for mobile wallet accounts. The mobile wallet accounts may be created via interaction of the mobile wallet application 116 with the mobile wallet bank computer system 120. The user may or may not have conventional bank accounts with the banking entity that maintains the mobile wallet bank computer system 120. If the user does not have bank accounts with the entity that maintains the mobile wallet bank computer system 120, then accounts associated with another banking entity may also be used. Again, in such an embodiment, the flow of funds into and out of the mobile wallet accounts may also be processed by the first banking entity using the mobile wallet bank computer system 120.

The mobile wallet bank computer system 120 is configured to store information regarding mobile wallet accounts. By way of example, information for a specific mobile wallet account 125 is shown as being stored in the accounts database 124. As will be appreciated, the accounts database 124 may also store information regarding many other mobile wallet accounts (not shown). As will also be appreciated, the extent to which transaction details are tracked and maintained in account processing logic 122 and stored in a storage database provided by the mobile wallet bank computer system 120 may vary in differing embodiments. The account database 124 may store details regarding credit card accounts. In particular, the account database 124 may store each financial transaction that occurred. Each financial transaction may include the amount of the transaction and the merchant.

The code generator 118 may receive a request from an account holder to initiate a transaction. In response, the code generator 118 may generate a code that may be transmitted by the mobile device 110 to the merchant computer system 140. As will be appreciated, any suitable method may be used to transmit the code. In various embodiments, the code may be transmitted using optical image methods (e.g., QR code), NFC, wireless, Bluetooth, low energy Bluetooth, RFID, hypersonic, Wi-Fi, cellular 3G, 4G, GSM, LiFi, etc. For purposes of providing an example, it is sometimes assumed in the discussion of FIGS. 1-11 that an optical method is used (e.g., QR code). In various embodiments, the code may be generated without the account holder providing the merchant's name or amount of transaction. The code generator 118 can be configured to generate a code that incorporates at least one of a date, time, trace ID, unique transaction identifier, and geographic location of the mobile device. In other embodiments, the code generator 118 may generate a tokenized numerical code that is in the Track 1 and Track 2 formats as specified by the ISO 8583 specification.

The code may incorporate at least a portion of an account number for a source account that is associated with the mobile wallet account. The incorporated user account number indicates the payment method to be associated with the transaction (e.g., which of the user's credit cards will be used for the transaction). The code may be generated such that a combination of random digits and a portion of a payment card number are included in the code, e.g., so that the last four digits appearing on a receipt provided to the user match those of the user's actual card number, even though a substitute card number was provided to the merchant. The various fields of such a code, and the format of such a code, are described in greater detail in FIGS. 5-8.

The mobile wallet account 125 holds funds that are transmitted to a recipient 140 upon receiving instructions from the user through the mobile device 110. As described below, funds flow into and out of the mobile wallet account 125 through the payment system 150. The mobile wallet account logic 120 is connected to the payment system 150 through the network 160. The network interface logic 126 may include, for example, program logic that connects the mobile wallet bank computer system 120 to the network 160.

The mobile wallet bank computer system 120 further includes transaction verification logic 127. The transaction verification logic 127 may receive a transaction amount from the merchant computer system 140. In some embodiments, the transaction verification logic 127 may generate a message to send to the mobile device 110 for verifying the transaction amount. Upon receiving the verification message, the account holder via the mobile device 110 may approve or deny the transaction amount for the mobile wallet bank computer system 120.

The source account computer system 130 includes account processing logic 132, an accounts database 134, and network interface logic 136. In an example embodiment, as previously indicated, during registration process for the mobile wallet account 125, the user may be prompted to identify a source account 135, that is, a source of funds for the mobile wallet account. The source account 135 may be an existing demand deposit account or a credit card account held by the user with the same financial institution or another financial institution. When the mobile wallet account 125 is created, the user is prompted to provide bank account information (e.g., routing number and/or account number) for the source account 135 that is used as a source of funds for the mobile wallet account 125. Thus, the financial institution that provides the mobile wallet account 125 for the user and the financial institution that typically provides banking services to the user may be two different financial institutions. In such situations, a second banking entity that maintains and handles transaction processing for source accounts may operate the source account computer system 130. In other situations, the computer systems 120 and 130 may be considered as being integrated in a single payment processing system (e.g., if the two financial institutions are the same). As will be appreciated, in a situation where the mobile wallet computing system 120 has many users, some users may have all their mobile wallet source accounts at the same bank that operates the mobile wallet computer system 120, some users may have all their mobile wallet source accounts at a bank other than the same bank that operates the mobile wallet computer system 120, and some users may have some of their mobile wallet source accounts at the same bank that operates the mobile wallet computer system 120 and other of their mobile wallet source accounts at a bank other than the bank that operates the mobile wallet computer system 120.

The merchant computer system 140 may be used at a point of sale location to conduct transactions with the account holder. For example, the merchant computer system 140 may include a point of sale computer system such as a cash register system connected to a central server system operated by the merchant. As another example, the merchant computer system 140 may include a mobile computing device (e.g., smart phone, tablet PC, etc.) operated by a store clerk as the clerk moves throughout the store. Again, the mobile computing device in such an embodiment may connect to a central server system operated by the merchant.

The merchant computer system 140 includes network interface logic 142, a code scanner 144, location indicator logic 146, fund requesting logic 148, and fund receiving logic 149. In one embodiment, the network interface logic 142 is configured to allow the merchant computer system 140 to communicate with the network 140. The network interface logic 142 sends and receives data from the mobile device 110 and the mobile wallet bank computer system 120.

The code scanner 144 may be configured to scan codes, such as but not limited to, optically scanned or non-optically scanned codes. In the embodiment of the present disclosure, the code scanner 204 scans one or more types of codes. After receiving the code, the scanner 144 determines the information that was incorporated into the code by the mobile device 110 or the mobile wallet bank computer system 120 that generated the code, as described below.

The location indicator logic 146 provides an indication of the geographic location of the code scanner 144. In one embodiment, the location indicator logic 146 may be programmed with the known address of the merchant location as the location of the code scanner, such that the location of the merchant can be compared with the location of the mobile device 110 as part of authenticating a transaction.

The fund requesting logic 148 communicates a fund request via the network interface logic 142 to the acquirer/processor computer system 145. In some embodiments, the fund requesting logic 148 may send the tokenized card number (that includes an issuer identification number (T N), trace ID (generated numbers), checksum helper digit, last 4 digits of the actual card number) received from the user to the acquirer/processor computer system 145. In response to receiving a tokenized card number, the acquirer processor computer system 145 sends the tokenized card number to the mobile wallet bank computer system 120, which in turn sends the actual card number and a trace ID (embedded within the issuer discretionary field) to the acquirer processor computer system 145. The fund receiving logic 149 determines when payment has been received by the merchant computer system 140 and allocates the payment accordingly.

The merchant computer system 140 may further connect to or integrate with other hardware. For example, in one embodiment, the merchant computer system 140 may connect to a card reader for reading credit cards, debit cards, stored value cards, and so on. As another example, the merchant computer system 140 may be configured to prompt the user to provide a random security code. The random security code may be generated by the mobile device 110, by a separate security dongle, or in another manner. The security code may be provided to the merchant computer system 140 directly by the mobile device, may be keyed into the merchant computer system 140 (e.g., by a store clerk), or may be received in another manner.

The acquirer processor computer system 145 includes a computer system that transmits and receives messages from the mobile wallet bank computer system 120, the merchant computer system 140, or the payment system 150. In various embodiments, the acquirer processor computer system 145 may receive the tokenized card information and route the received information to the mobile wallet bank computer system 120. In other embodiments, the acquirer processor computer system 145 may receive the actual card information from the mobile wallet bank computer system 120 with the trace ID embedded within the issuer discretionary field in track 2 format. In some embodiments, the acquirer processor computer system 145 may transmit the actual card information with the trace ID to the payment system 150. In various embodiments, the acquirer processor computer system 145 may process the payment in the mobile wallet system described herein.

In other embodiments, and as previously noted, the acquirer processor computer system 145 may instead route the tokenized card information with the trace ID number to payment system 150. In turn, the payment system 150 may provide the substitute card number to the mobile wallet computer system 120, which, after authenticating the transaction, may then return the actual card number to the payment system 150. The payment system 150 may then provide the actual card number to a source account computer system 130 for payment processing.

The payment system 150 may comprise at least one card network 152. In some embodiments, the payment system comprises multiple card networks 152, such as Visa®, MasterCard®, American Express®, Discover®, Diners Club®, etc. In such an embodiment, the appropriate card network 152 may be determined based on the first digit of the actual account number (i.e., "4" corresponding to Visa®, "5" corresponding to Mastercard®, "6" corresponding to Discover®, and so on). The acquirer processor computer system 145 may therefore route the transaction to the appropriate card network 152 based on the first digit of the substitute credit card number. The card network 152 may then route the substitute card number to the mobile wallet computer system 145 based on the issuer identification number (IIN). For example, the card network 152 may identify the credit card number provided by the acquirer processor computer system 145 as being a substitute credit card number and not an actual credit card number based on the TIN. In one embodiment, this identification occurs based on the IIN being a card network-owned IIN that has been licensed to the mobile wallet bank and that has been designated by the mobile wallet bank and the card network for use in mobile wallet transactions. In such an arrangement, the acquirer processor computer system 145 processes the transaction like any other credit card transaction, and it is not necessary for the acquirer processor computer system 145 to be aware that the transaction is a mobile wallet transaction. Given the relatively limited number of card networks (e.g., Visa®, MasterCard®, American Express®, Discover®, Diners Club®, etc.), and given the much larger number of acquirer/processors, such an arrangement has the technical benefit of reducing modifications to existing computer systems to implement the features described herein. In other embodiments, this identification is made based on an indication from the merchant computer system 140 and/or the acquirer processor computer system 145 that the transaction is a mobile wallet transaction. Based on the TIN, the card network 152 may transmit the substitute card number to the mobile wallet computer system in turn receive the actual card number, expiration date, and authentication code (e.g., cvv, etc.) from the mobile wallet bank computer system 120.

The payment processing system 100 may further include additional bank computer systems that may allow the mobile wallet platform of the present disclosure to be accessed by consumers and merchants that bank at various different banking institutions. The additional bank computer systems may provide the services described herein through multiple banks, allowing for broader adoption of the mobile wallet platform.

Figure 2:
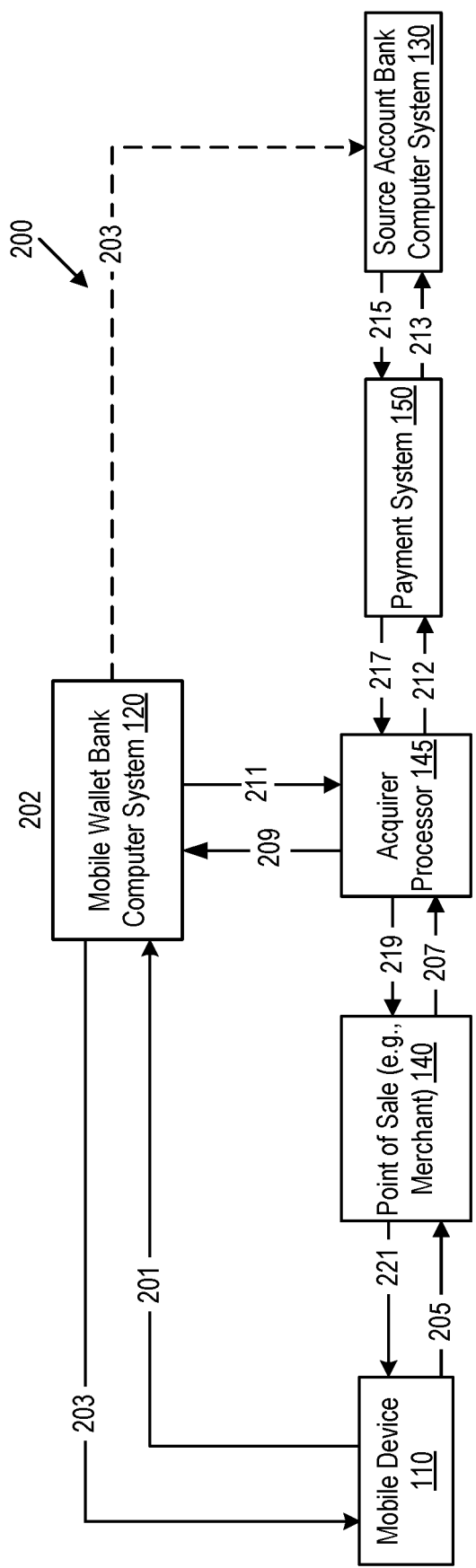
FIG. 2 illustrates a payment process that may be implemented by the system in FIG. 1 according to an example embodiment.

FIG. 2 illustrates a process 200 that may be implemented by the system in FIG. 1. When a user wishes to make a payment at a merchant, for example, the user may access the mobile wallet client application 116 by entering a PIN or other login credentials and then selecting a "pay now" or similar button. For example, the user may be located at a merchant location and may wish to pay for a good or service. As another example, the user may be located away from the merchant location or be engaged in an online transaction.

At step 201, the mobile device 110 requests access to funds in the mobile wallet via the mobile wallet bank computer system 120 to pay for a good or service. The mobile device 110 may provide a PIN, a customer ID, and a device ID to the mobile wallet bank computer system 120. The user may be identified and authenticated based on a match of these three data elements with information stored in the mobile wallet bank computer system 120. Further, the user's mobile wallet account information may be located/determined.

Next, at step 202, the mobile wallet bank computer system 120 may generate a tokenized credit card number as described in greater detail below. The tokenized credit card number may include a few generated numbers and a few numbers from the actual credit card number. In one embodiment, the tokenized credit number starts with an issuer identification number (T N) that corresponds to the mobile wallet bank computer system 120, ends with the last four digits of the actual credit card account number of the credit card that is being used in the transaction, and further includes intervening digits including a trace ID and a checksum helper digit. The trace ID is described in further detail below and allows for enhanced authentication during the payment process. The may permit checksum verification of the tokenized credit card number. Various checksum algorithms may be used to verify that the tokenized credit card number is a valid credit card number.

The tokenized credit card number may be transmitted to the mobile device 110 in the form of a code. For example, the data may be encoded in accordance with the track 1 and/or track 2 formats used in the magnetic stripes of credit cards. In some embodiments, the code is formatted in Track 2 format. In either case, the primary account number field may contain the tokenized credit card number and the issuer discretionary field may contain the payment token. In yet other embodiments, another format is used.

At step 203, the tokenized credit card number is transmitted to the mobile device 110. If the mobile wallet bank computer system 120 and the source account computer system 130 are different computer systems (e.g., if the user is using a credit card that is provided by a different bank than the bank the operates the mobile wallet computer system 120), then the trace ID may also be sent to the source account computer system 130 at step 203.

At step 205, the mobile device 110 may display or otherwise transmit the tokenized credit card number to merchant computer system 140 (e.g., using a QR code, NFC, wireless, Bluetooth, low energy Bluetooth, RFID, hypersonic, Wi-Fi, cellular 3G, 4G, GSM, LiFi, or other method). At step 207, after receiving the tokenized card number, the merchant computer system 140 sends the transaction to an acquirer processor computer system 145 for processing.

Next, at step 209, the acquirer processor computer system 145 sends the tokenized card number to the mobile wallet bank computer system 120. After receiving the request from the acquirer processor computer system 145, the mobile wallet bank computer system 120 may determine the actual card number and send the actual card number back to the acquirer processor at step 211. In one embodiment, the determination of the actual card number may occur by searching for the account information associated with the payment token and/or trace ID within the tokenized card number. Additionally, the trace ID from the tokenized card number may be sent with the actual card number at step 211. At this point, the issuer discretionary field is no longer need for the payment token, hence, the trace ID may be sent to the acquirer processor computer system 145 in the issuer discretionary field.

At step 212, the acquirer processor computer system 145 sends the actual card number and the trace ID to the payment system 150 for processing a payment. The payment system 150 sends the actual card number with the trace ID and the transaction amount to the source account bank computer system 130 at step 213. The source account bank computer 130 may retrieve the trace ID that was received from the mobile wallet bank computer system 120 by searching for the actual card number that was received from the payment system 150. The source account bank computer 130 may compare the trace ID that was received/stored at step 203 with the trace ID that was received from the payment system 150 at step 213. Assuming there is a match, the source account bank computer 130 may issue an approval for the transaction. After verifying the actual card number and the trace ID in the issuer discretionary field, the source account bank computer system 130 may send an approval to the payment system 150 at step 215. The approval message may be sent from the payment system 150, to acquirer processor computer system 145, to the point of sale system 140, in steps 217 and 219. Upon receiving the approval message the point of sale system 140 may generate a receipt for the user. In some embodiments, the receipt may be sent to the mobile device 110 electronically. In other embodiments, the receipt may be printed physically at the point of sale location. The receipt may include the last four digits of the actual credit card account number of the credit card that was used in the transaction.

The use of the payment token and trace ID as described herein allows for two levels of authentication. The payment token is generated by the mobile wallet computer system at step 202. The payment token is then transmitted to the mobile device 110, then to the merchant computer system 140, then to the acquirer processor computer system 145, and eventually back to the mobile wallet computer system 120 where it is matched with the original payment token generated at step 202. Similarly, the Trace ID is also generated by the mobile wallet computer system at step 202, and then transmitted to the mobile device 110, then to the merchant computer system 140, then to the acquirer processor computer system 145, and eventually back to the mobile wallet computer system 120 where it is matched with the Trace ID generated at step 202. In the case of the Trace ID, however, the Trace ID is then further transmitted back to the acquirer processor computer system 145, then to the payment system 150, and then to the source account computer system 130 where it is matched with the Trace ID generated at step 202. Accordingly, the trace ID used in conjunction with the tokenized credit card number allows both the mobile wallet bank computer system 140 and the source account bank computer system 130 to authenticate the transaction. Using the trace ID in the above described manner may permit the source account bank computer system 130 and the mobile wallet bank computer system 120 to verify the trace ID at least twice prior to approving a transaction and transferring funds. Further, and as described in greater detail below, the trace ID may be used by the source account computer system 130 to determine whether the credit card transaction was a mobile wallet transaction (e.g., as opposed to an in-person card-present transaction involving use of the user's physical credit card, as opposed to an online transaction, and so on). Hence, the source account bank computer system 130 may provide a different customer experience to the mobile wallet user. The source account bank computer system 130 may also determine risk differently for transactions that use a mobile wallet.

In some embodiments, instead of embedding the trace ID in a tokenized credit card account number at step 202, the actual credit card number is transmitted to the mobile device 110 and the merchant computer system 140. In such an embodiment, the trace ID may be included in the issuer discretionary field at step 202, and the payment token may be communicated in another manner or another payment matching mechanism may be used. The trace ID may be stored in the issuer discretionary field and may travel though the payment processing system, until it is verified by the source account bank computer system 130. After being verified by the source account bank computer system 130, the transaction may be approved and the funds may be transferred from the source account bank computer system to the acquirer processor computer system 145. In other embodiments, the same financial institution may own the source account bank computer system 130 and the mobile wallet bank computer system 120.

Figure 3:
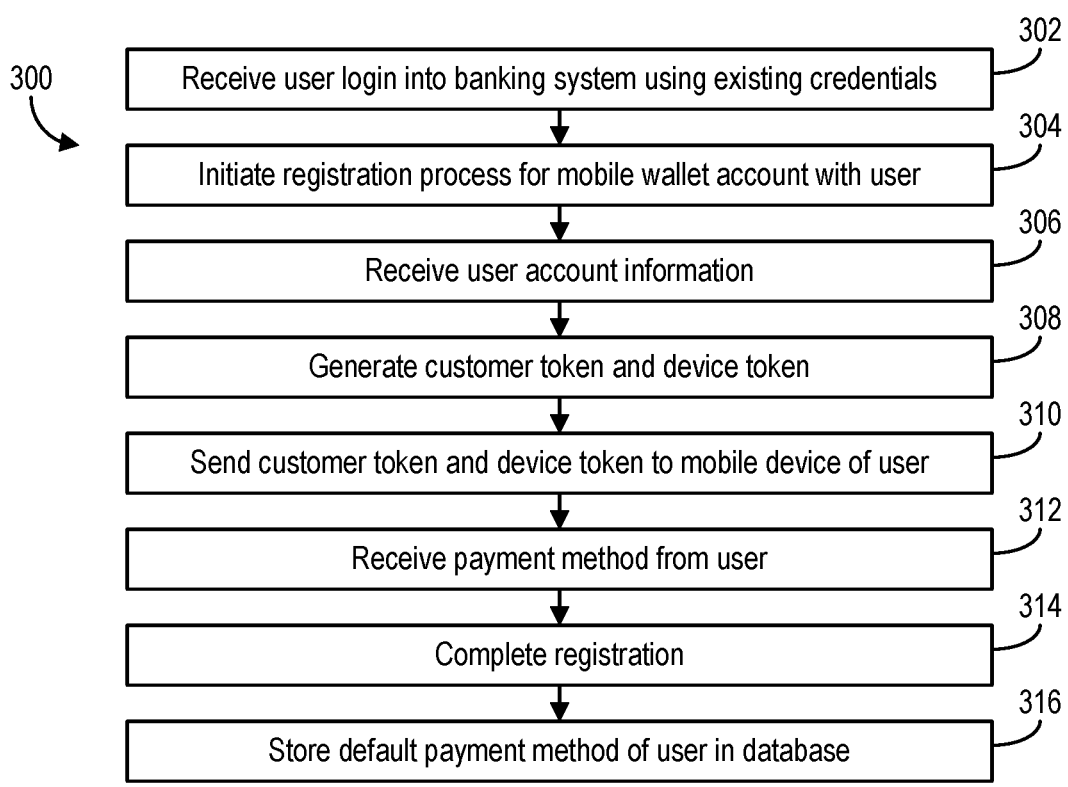
FIG. 3 illustrates a user registration process and a token generation process during registration, according to an example embodiment.

Referring now to FIG. 3 and FIGS. 3A-3F, FIG. 3 is a flow chart of a process 300 detailing a user registration process and a token generation process during registration, according to an example embodiment. FIGS. 3A-3F are screens that may be displayed to the user during the process 300 of FIG. 3 according to an example embodiment. Process 300 may be executed by a mobile device 110 and a mobile wallet bank computer system 120 that is configured to create and manage a mobile wallet account. Process 300 may be executed for a user who wishes to start a mobile wallet account 125 for a source account 135. In the example of FIG. 3, it is assumed that the user has an account at the bank that operates the mobile wallet computer system 140. As will be appreciated, a similar process may be used for users that have accounts only at other banks.

Figure 3A:
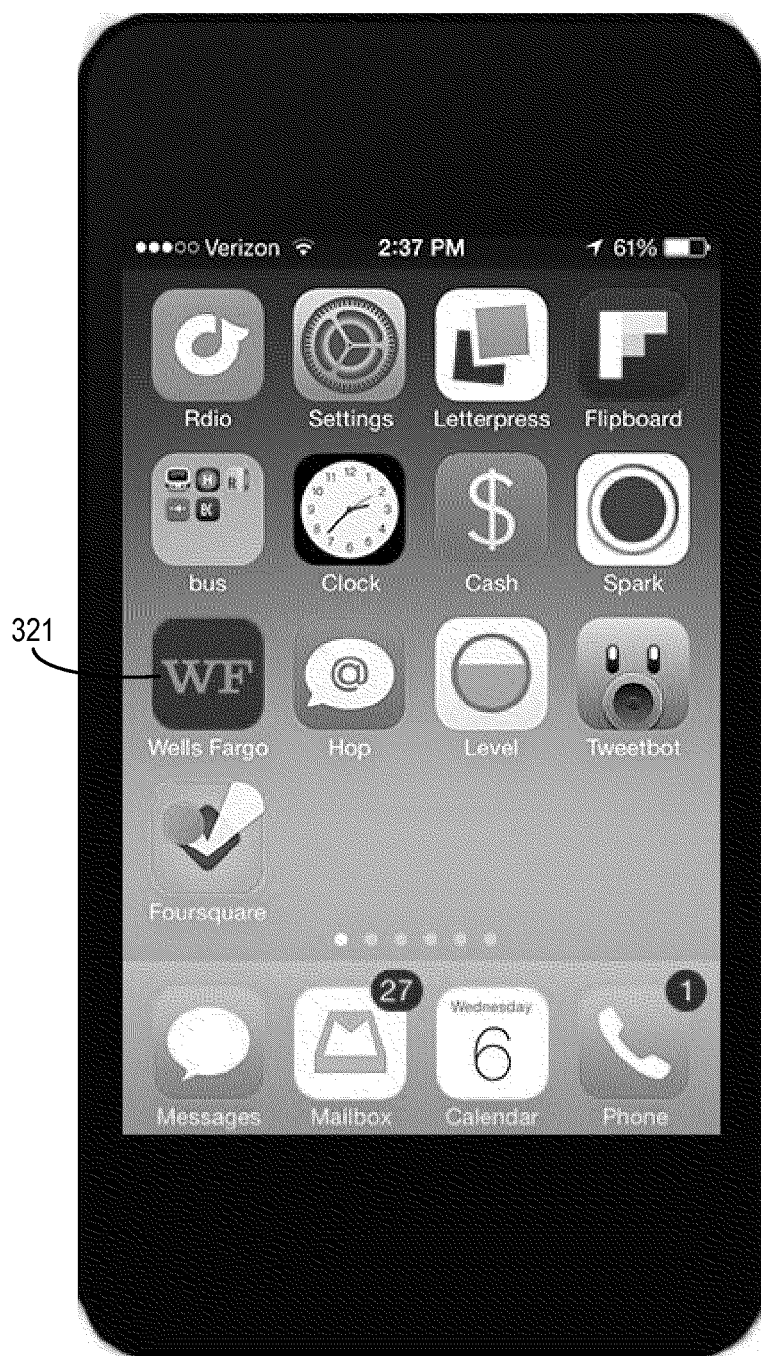
FIGS. 3A-3G illustrate display screens that may be displayed to the user during the process of FIG. 3.

As previously indicated in connection with FIG. 1, a user may perform the registration via an online banking website of the mobile wallet bank. For example, as shown in FIG. 3A, a user may select a button 301 for an online banking application on the mobile device 110.

Figure 3B:
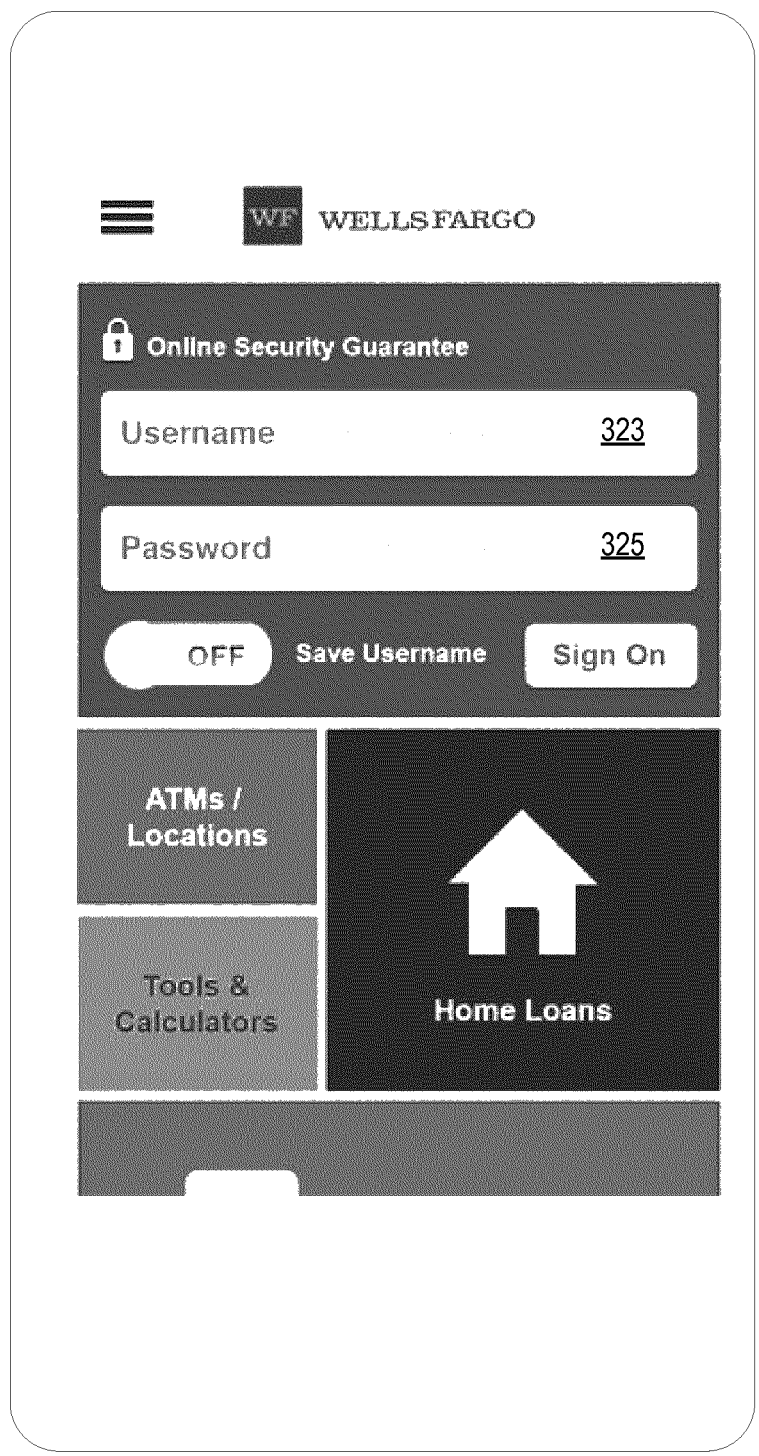
Figure 3C:
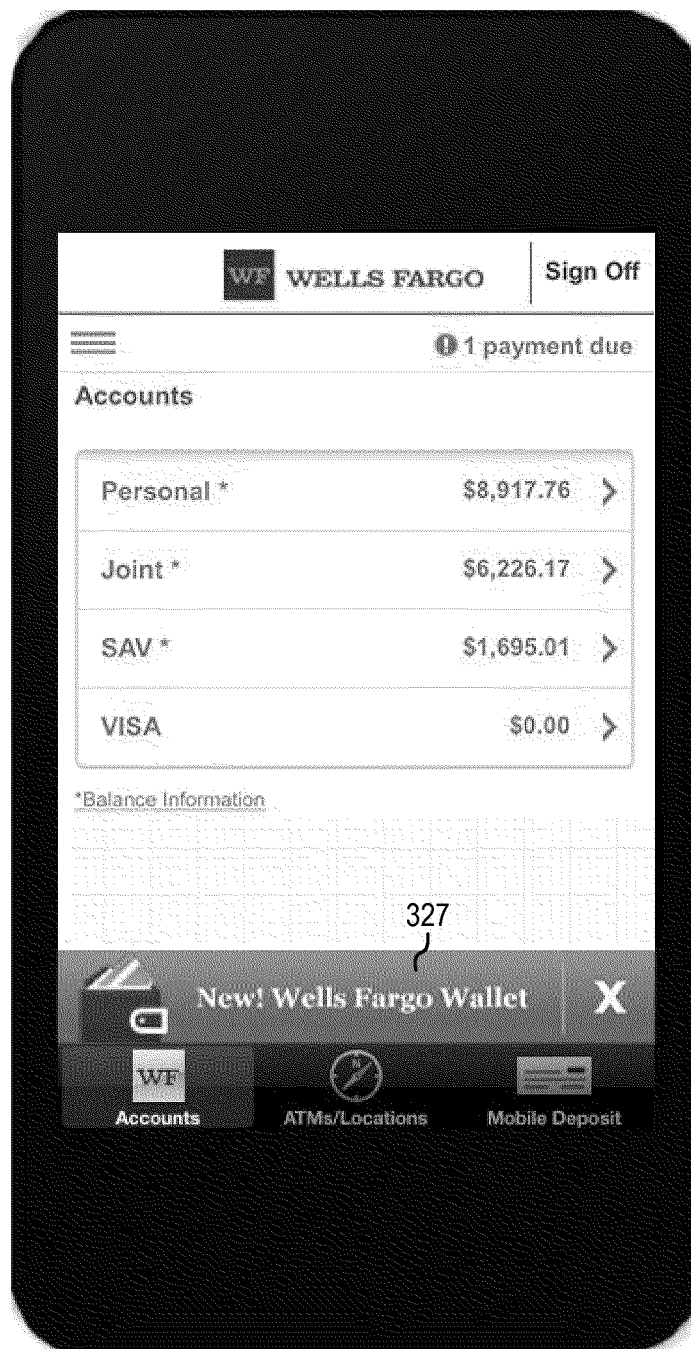

After the button 301 is selected, the user may be presented with a screen as shown in FIG. 3B. Process 300 includes receiving user authentication information into the mobile wallet bank computer system 120 using existing financial institution credentials (step 302). Existing credentials may include, for example, a username and password combination or card information (card number, account number, expiration date, CVV) for an online banking website of the bank that operates the mobile wallet computer system 120. For example, in FIG. 3B, the credentials are entered in fields 303 and 305, respectively, of a login screen to the online banking website. In one embodiment, the credentials may match keyboard-entered credentials that are used to access the source account via online banking. In other embodiments, the credentials may match other types of authentication credentials that are used to access online banking (e.g., facial recognition on a captured image or video of the user on a camera of the mobile device, voice or speech recognition captured by an input device of the mobile device, fingerprint authentication, etc.). After providing online banking login credentials as shown in FIG. 3B, the user may be taken to a top-level online banking screen as shown in FIG. 3C. The screen shown in FIG. 3C shows an overview of accounts and account balances held by the user.

Figure 3D:
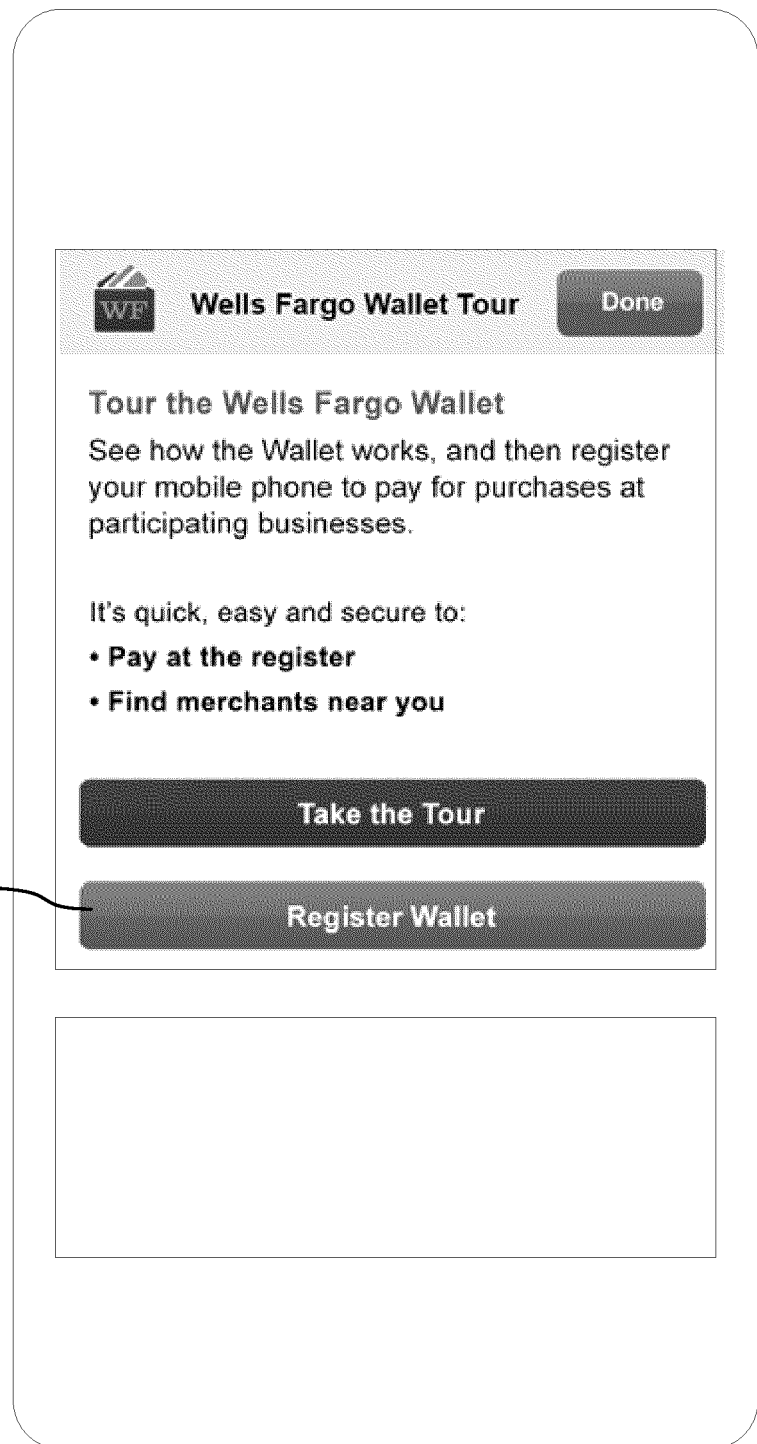
Figure 3E:
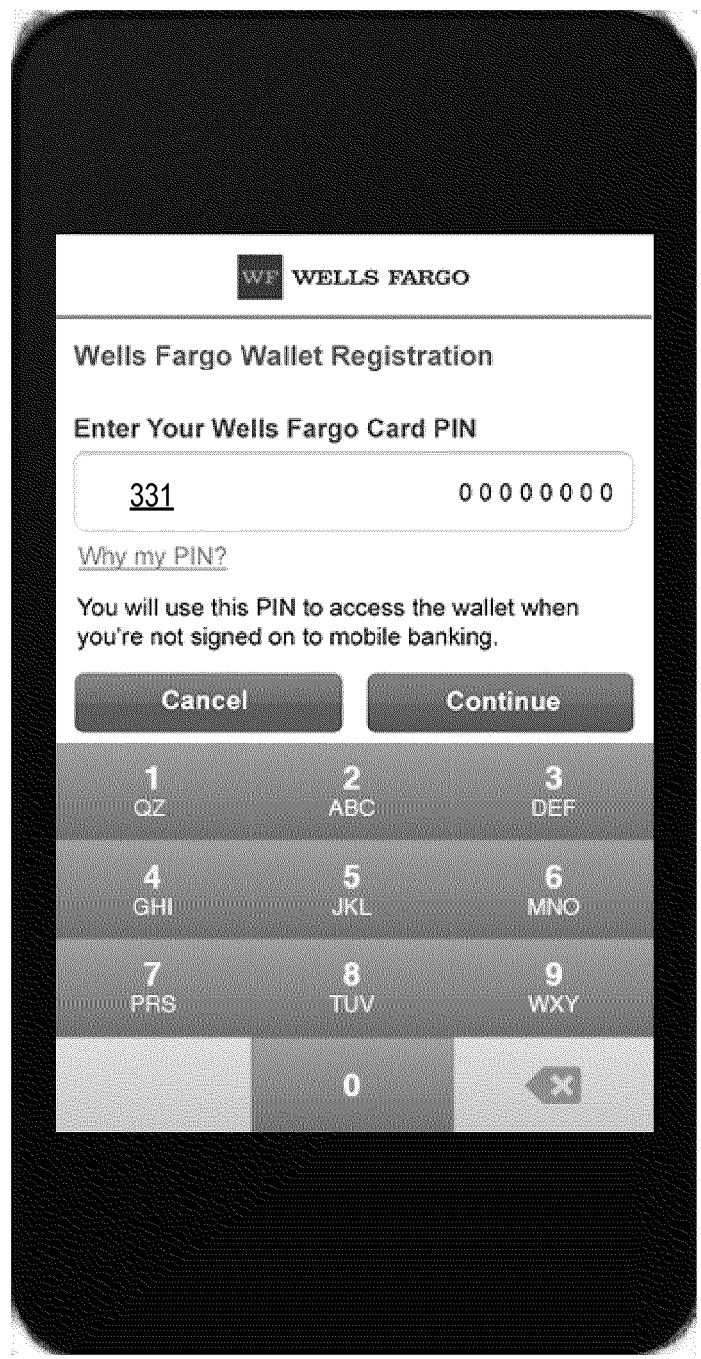

Process 300 further includes initiating a registration process for a mobile wallet account with the user (step 304). Step 304 includes receiving a user indication to create a new mobile wallet account. In some embodiments, the user may be presented with a menu option on his or her mobile device to create a new mobile wallet account, among other options. For example, in the top-level screen shown in FIG. 3C, a button 327 is provided that allows the user to receive additional information about the mobile wallet application. After selecting the button 327 in FIG. 3C, the user may be taken to a mobile wallet introductory screen as shown in FIG. 3D. In the screen shown in FIG. 3D, the user is provided with an option to tour the mobile wallet application and with an option to initiate the mobile wallet registration. Upon selecting button 329, the mobile wallet registration process is initiated. After selecting the button 329 in FIG. 3D, the user may be taken to a first screen for the mobile wallet registration as shown in FIG. 3E.

Figure 3F:
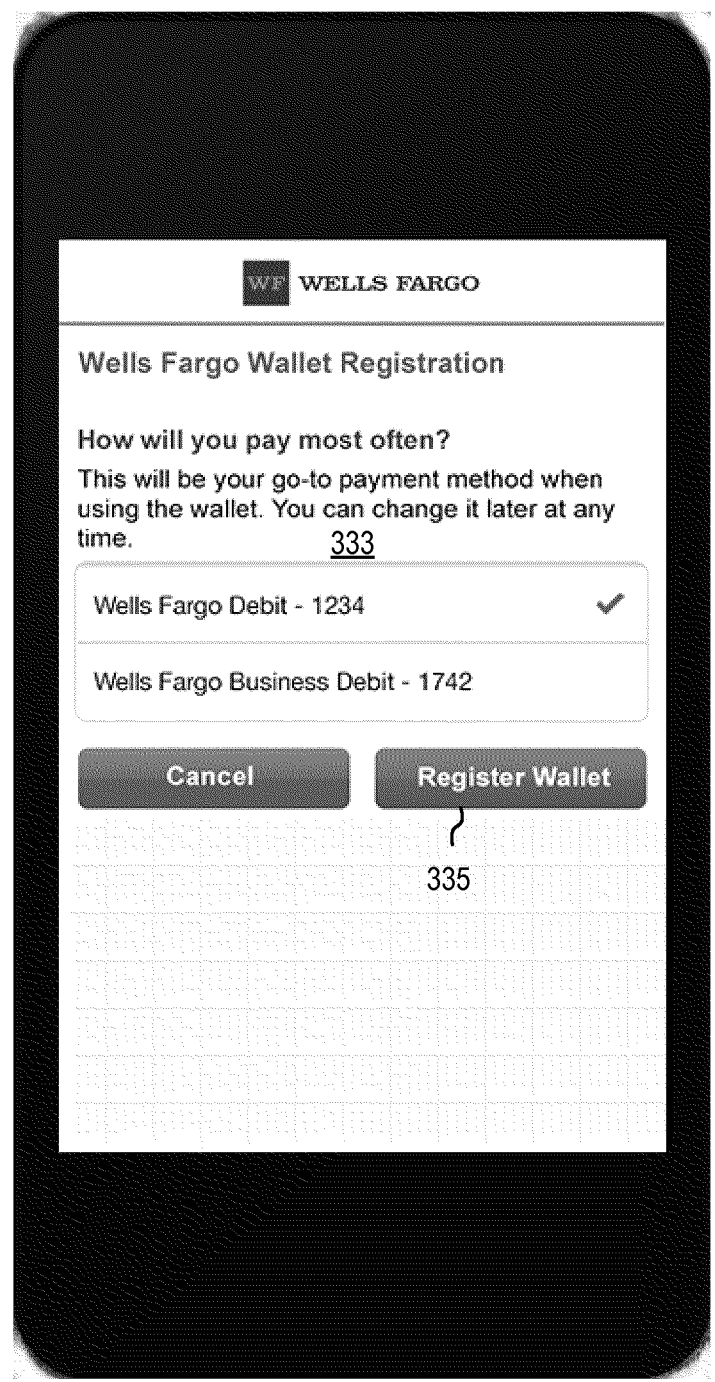

Process 300 further includes receiving user account information (step 306). Receiving the user account information may include prompting the user to provide mobile wallet login credentials, e.g., a PIN number associated with a debit card or credit card held by the user at the bank. For example, in FIG. 3E, the user enters a PIN number in field 331. The user may also be prompted to identify the source account(s) the user wishes to associate with the mobile wallet account. For example, the user may enter information about accounts held at other banks that may serve as source accounts. In other embodiments, the user may be presented with various fields on the mobile device that allow the user to select one or more source accounts held by the user, to enter account information (e.g., an account number) in one or more fields, or otherwise. For example, as shown in FIG. 3F, the user may be presented with a list 333 of accounts the user has with a particular source account bank computer system, and may choose one or more accounts to view account information and to select the account for use with the mobile wallet account. Thus, the mobile wallet may auto-provision the existing accounts of the user to the mobile wallet, without the user having to manually enter the 16-digit credit card account number or other account information (e.g., in the case of other types of financial accounts). The user may further provide information to create a user profile including other information as warranted. In some embodiments, the mobile wallet computer system 120 may establish a connection with the computer systems 130 of other financial institutions, such that the accounts held by the user at the other financial institutions may be auto-provisioned to the mobile wallet as well. In both cases, the user may be provided with information about current account balances regarding the accounts.

Process 300 further includes generating a customer token and device token (step 308), and sending the customer token and device token to the mobile device of the user (step 310). The customer token and device token may be tokens that identify the user and the associated mobile device to the mobile wallet bank computer system in the future. The tokens are encrypted by the mobile wallet bank computer system and provided to the mobile device. The mobile device stores the tokens for future use. In one example embodiment, each time the user accesses the mobile wallet system with a new mobile device 110, the mobile device is assigned its own device token. A device and customer token are stored on each device in order to bind the device to the user (one device can only have one wallet user, but one user can have multiple devices). Once a mobile device for mobile wallet account is registered, the user only needs to enter their existing PIN to access their mobile wallet from the registered device (which PIN may be typically eight characters or less and consist only of numbers). The full login credentials associated with online banking are not needed (which often consist of a combination of lower case letters, upper case letters, numbers, and special characters (e.g., punctuation marks)). Instead, possession by the user of the registered device provides an additional level of authentication that avoids the need for full login credentials. Additionally, it may be noted that the level of functionality available the user through the mobile wallet may be less than the level of functionality available to the user through the full online banking website, thereby providing further risk mitigation.

Process 300 further includes receiving a default payment method from the user (step 312) and completing the registration (step 314). Step 314 may include a user accepting terms and conditions associated with use of the mobile wallet account. The default payment method may indicate how a user wishes to normally pay for a particular transaction. For example, the user may provide options relating to how to manage overdrafts, whether the total payment should be provided in one or more payments, or otherwise. Process 300 may include storing the default payment method (step 316) in the profile database of the mobile wallet bank computer system 120 (or another database of the mobile wallet bank computer system). The default payment method may be recalled by the mobile wallet bank computer system 120 during a future payment process.

Figure 3G:
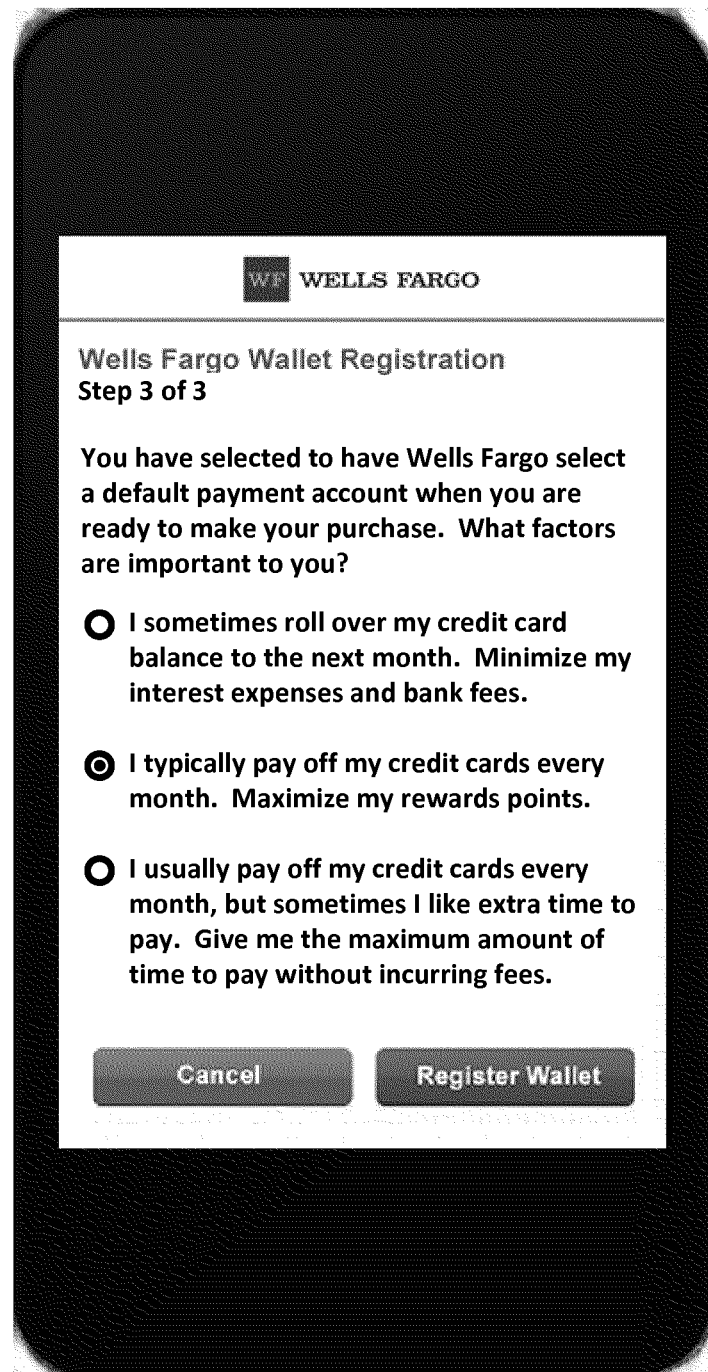

Referring now to FIG. 3G, in some embodiments, rather than receive a default payment method from the user at step 314, user preferences are received and the mobile wallet computer system 120 includes a payment method selection module that dynamically selects a default account at the point of sale based on the user preferences, current account account balances, and/or other information. For example, as shown in FIG. 3G, the user may specify preferences such as "minimize my interest expenses and bank fees" or "maximize my rewards points." For example, for a user that typically pays off credit card balances every month, interest expenses may not be a concern, and such a user may wish to maximize rewards points. On the other hand, for a user that does not pay off credit card balances, interest expenses may be more of a concern. As another example, some users may wish to maximize the amount of time available to pay for a purchase. For example, if the user has two credit cards with different billing cycles, then which card is selected as the default payment method may vary depending on when payment would be due for the purchase for each of the two credit cards. Additional examples are given below in the context of FIGS. 4C-4D.

Process 300 may also include generating and sending an offline code token to the source account bank computer system. The offline code may be used by the payment processing system, and more particularly the source account bank computer system, to execute a payment for the user when the mobile device is offline, or for other account management purposes. In some embodiments, the mobile device may store one or more offline codes to provide to the merchant. The mobile device 110 may be able to conduct the transaction without contacting the mobile wallet bank computer system 120 and may provide the code to the merchant computer system 140.

As will be appreciated, the arrangement of FIG. 3 facilitates keeping a list of source accounts that is up to date and accurate to the user. For example, each time a transaction is to be performed, the mobile wallet computer system 120 may access a list of accounts held by the user at the mobile wallet bank. In some cases, an account that was previously active may no longer be active. For example, a user may have reported a physical credit card associated with a credit card account as having been lost or stolen. Prior to presenting a list of available source accounts to the user in the context of a particular transaction, the mobile wallet computer system 120 may determine that a previously-provisioned source account is no longer available as a source of funds. Hence, when the mobile wallet computer system 120 generates a screen display to present to the user via a mobile device showing the list of accounts held by the user at the financial institution, the previously-provisioned source account that is no longer available as a source of funds may be excluded from the list. When the list of available source accounts is presented to the user, the user may select a new source account for the transaction. For example, if the credit card account was the user's default payment method, the user may select a new default payment method (e.g., an existing demand deposit account).

Additionally, the arrangement may also permit new accounts to be activated and added to the mobile wallet, e.g., a new card account, a new savings account, a new line of credit, and so on. In the case of a new card account, the new card account may, for example, be a new credit card account, a new demand deposit account with a debit card, or an existing demand deposit account with a new debit card.

For example, in the case of a lost or stolen credit card, the bank may create a new credit card account in replacement of the credit card account for which the physical credit card was reported as having been lost or stolen. When the mobile wallet computer system 120 accesses the list of accounts held by the user, the mobile wallet computer system 120 may identify the new credit card account as being an account that has not yet been provisioned to the mobile wallet. When the screen display is generated showing the list of accounts held by the user, the list may then include the new credit card account, which may be selected by the user for provisioning to the mobile wallet. Again, the new credit card account may be provisioned to the mobile wallet without any manual entry by the user of account information regarding the new credit card account (other than the selection of the new credit card account by the user, indicating that the user wishes to add the new credit card account to the mobile wallet).

In the case of a new credit card account, the bank may issue a new credit card account immediately upon learning of the lost or stolen credit card associated with the previous credit card account. Typically, the bank may then mail the user a new physical/plastic credit card. Upon receiving the new physical credit card, the user may then activate the new credit card, e.g., by calling a credit card activation phone number printed on a sticker that has been placed on the card.

In some embodiments, the user may be provided with the option of activating the new credit card account through the mobile wallet. For example, the bank may perform a first activation of the new credit card account for purposes of transactions implemented via a mobile wallet. Such an activation may be performed via the mobile wallet itself (i.e., the user does not need to take any action outside of the mobile wallet to have the new credit card account activated). For example, the user may be prompted with a message indicating that the credit card account has not yet been activated, and querying whether the user wishes to do so now (e.g., "Click 'Yes' to activate your new credit card for your mobile wallet"). For security purposes, the first activation does not activate the credit card for non-mobile wallet transactions involving use of the plastic credit card. Rather, the bank may also perform a second activation of the new credit card account for purposes of transactions implemented via a physical credit card associated with the new credit card account. Hence, the plastic credit card is not useable for credit card transactions until the second activation occurs. Such an arrangement ensures that the user is in possession of the physical credit card before the physical credit card is activated for purposes of transactions implemented via the physical credit card (e.g., a card-present transaction at a bricks and mortar merchant).

As will be appreciated, it may often take several days or more for a new physical credit card to be produced and delivered to the user after the user reports a previous credit card as having been lost or stolen. In the arrangement described herein, the credit card account may be activated for mobile wallet transactions much earlier, before the credit card is activated for the non-mobile wallet transactions involving use of the plastic credit card. For example, the credit card account may be activated one or more days before the user receives the plastic credit card, or even within one day of the bank receiving the report from the user that the plastic credit card has been lost or stolen. In some embodiments, the new credit card account may be activated for the mobile wallet within one hour or less of receiving the report from the user that the plastic credit card has been lost or stolen.

In other embodiments, when a credit card is reported as lost or stolen, the mobile wallet computer system 120 may permit the user to continue using the credit card number associated with the plastic credit card for mobile wallet transactions, but prevent the plastic credit card from being used for card-based transactions. When a physical credit card is lost or stolen, the physical credit card has been compromised. However, for purposes of the mobile wallet bank computer system 120, the account number is simply an account identifier. So long as the mobile wallet has not been compromised, the mobile wallet computer system 120 can ensure the integrity of the transaction based on the fact that the user is in possession of the mobile device 110, particularly in situations where at a point of sale a tokenized card number is used, anyway (e.g., as described above in connection with FIG. 2).

Referring now to FIG. 4 and FIGS. 4A-4D, FIG. 4 is a flow chart of a process 400 detailing a payment code generation process for an authenticated mobile wallet session, according to an example embodiment. FIGS. 4A-4D are screens that may be displayed to the user during the process 400 of FIG. 4 according to an example embodiment. Process 400 may be executed for a user requesting to execute a payment (e.g., transaction) with a merchant or other recipient 140. Process 400 may be executed by a mobile wallet bank computer system 120 configured to manage the user mobile wallet account.

Figure 4:
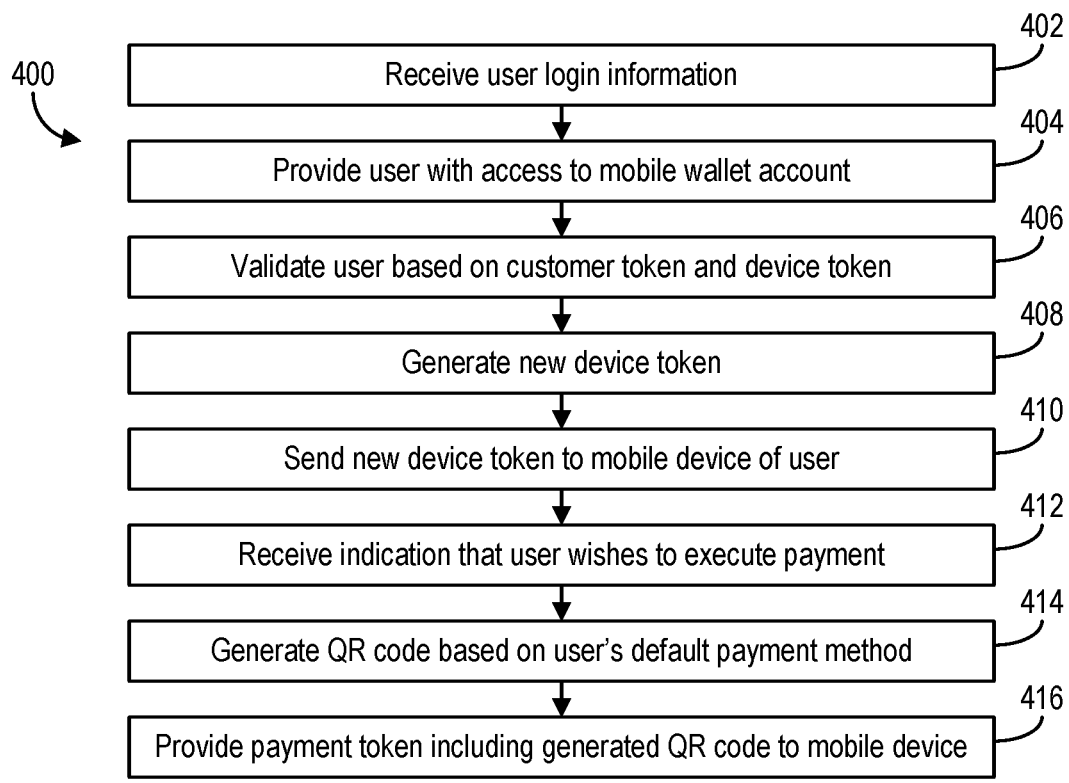
FIG. 4 illustrates a payment code generation process for an authenticated mobile wallet session, according to an example embodiment.
Figure 4A:
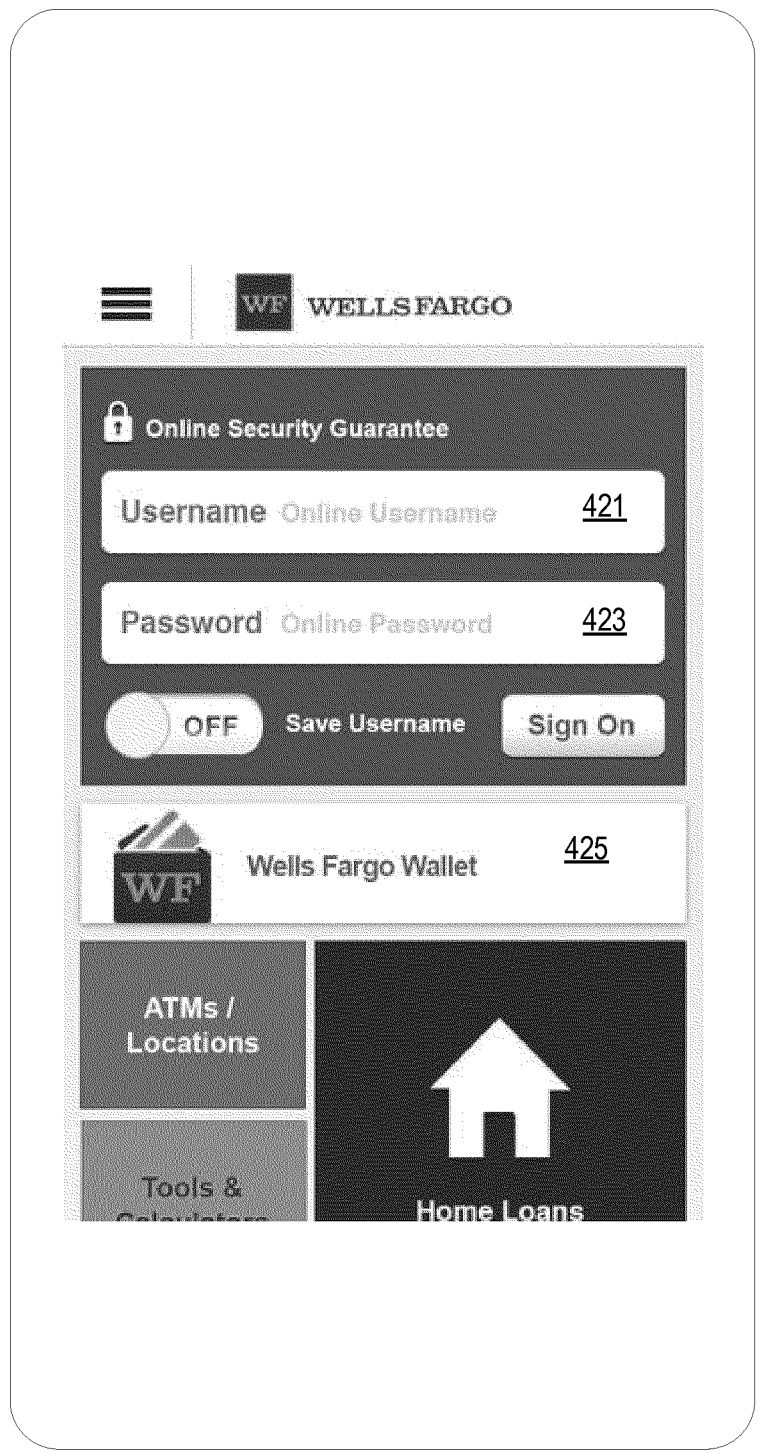
FIGS. 4A-4D illustrate display screens that may be displayed to the user during the process of FIG. 4.

FIG. 4A shows a mobile banking screen that may be displayed to the user after the mobile wallet application has been installed on the mobile device 110. Similar to FIG. 3B, the user is prompted in FIG. 4A to provide full online banking login credentials (fields 323 and 325). By providing such credentials in fields 323 and 325, the user may be provided with the full functionality of the online banking website. However, in FIG. 4A, the user is also provided with a second option, namely to provide mobile wallet login credentials (via selecting button 425). Hence, in FIG. 4A, the user is presented with two possible authentication paths, a first authentication path that prompts the user to provide online banking login credentials to gain access to online banking, and a second authentication path that prompts the user to provide mobile wallet login credentials to gain access to the mobile wallet. If the user selects the second authentication path, the user is delivered to the more payment-focused functionality of the mobile wallet.

Figure 4B:
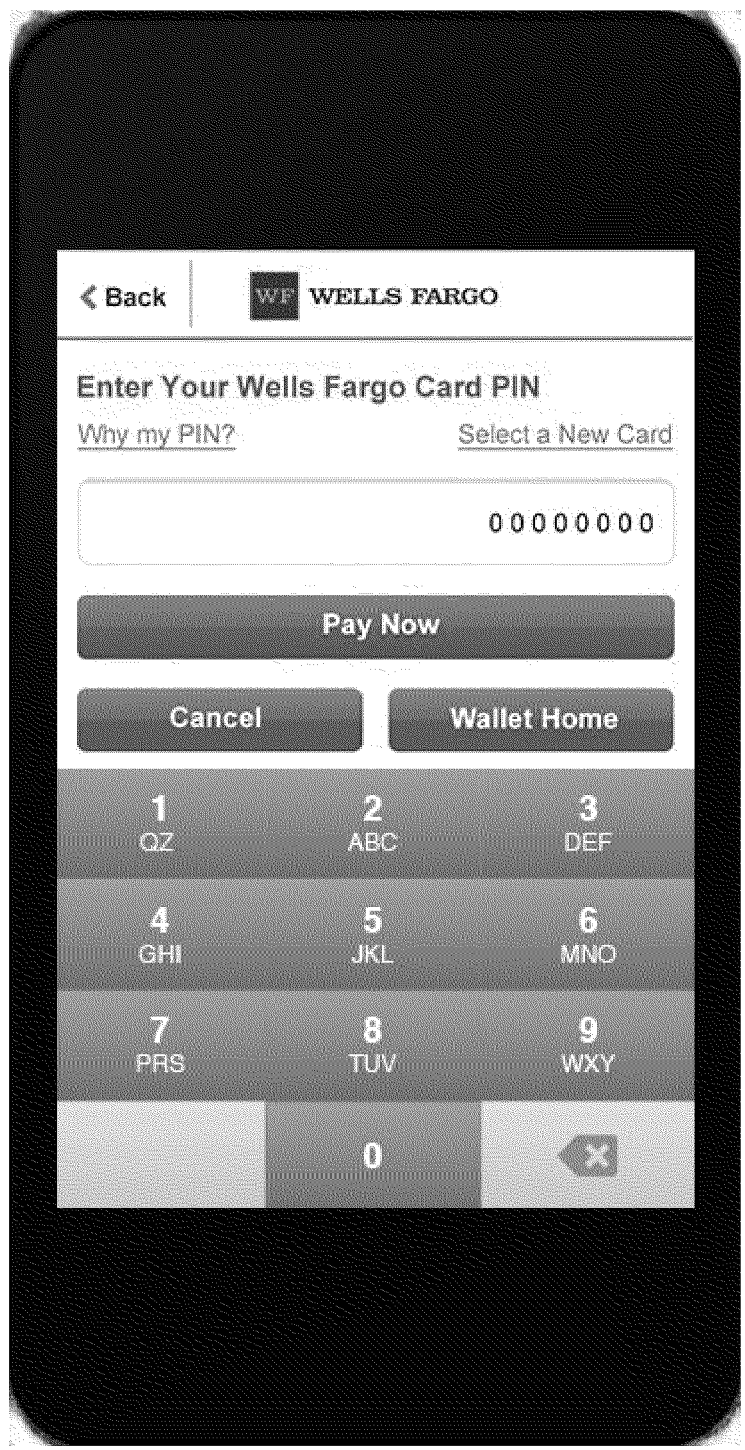

Process 400 includes receiving a PIN from the user (step 402) to authenticate the user (FIG. 4B). At step 402, the mobile wallet client application 116 prompts the user for a PIN that was used during the registration steps in process 300. Hence, as previously indicated, the user may be authenticated based on the user's mobile wallet banking credentials (e.g., 4 digit PIN), rather than being prompted to provide the user's usual online banking authentication credentials (username and password).

In an alternative embodiment, a user may log into a mobile banking session with a source account bank computer system, or the user may directly access the mobile wallet bank computer system. Process 400 further includes allowing the user access to his or her mobile wallet account (step 404). For example, the user may access his or her mobile wallet account through his or her account at the source account bank computer system, or may log into his or her mobile wallet account at the mobile wallet bank computer system by providing a PIN or other identifier to the mobile wallet bank computer system.

Process 400 further includes validating the user based on the customer token and device token (step 406). When the user logs in to access his or her mobile wallet account, the customer token and device token stored on the mobile device (stored during step 310 of process 300) are provided to the mobile wallet bank computer system. The mobile wallet bank computer system 120 validates the user and/or the mobile device for use with the mobile wallet account. Step 406 may further include validating the user based on the PIN or other identifier also provided to the mobile wallet bank computer system 120. For example, in order to be validated, the customer token, the device token, and the PIN may all need to match (i.e., be associated with each other in the mobile wallet computer system 120). As previously indicated, each user may have one customer token and one PIN which together are associated with multiple device tokens (such that the user can access the mobile wallet account from multiple devices).

Process 400 further includes generating a new device token (step 408), and sending the new device token to the mobile device of the user (step 410). Hence, in some embodiments, the device token may change each time the user uses the device. The device token may be a token that will identify the user and the associated mobile device to the mobile wallet bank computer system 120 in the future. More particularly, the device token may identify a current mobile wallet application session of the user. In other words, the token may be used to identify a particular function that the user may perform during the current mobile wallet application session, such as initiating a purchase. The token is encrypted by the mobile wallet bank computer system 120 and provided to the mobile device. The mobile device stores the device token for future use.

Figure 4C:
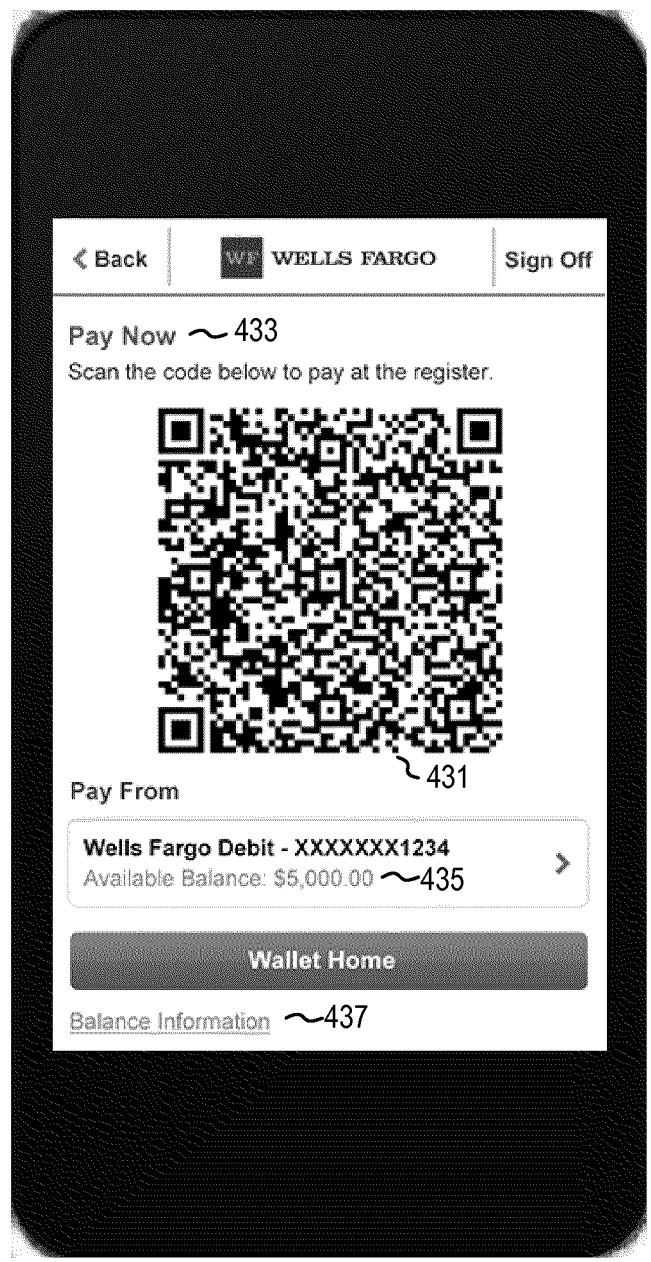
Figure 4D:
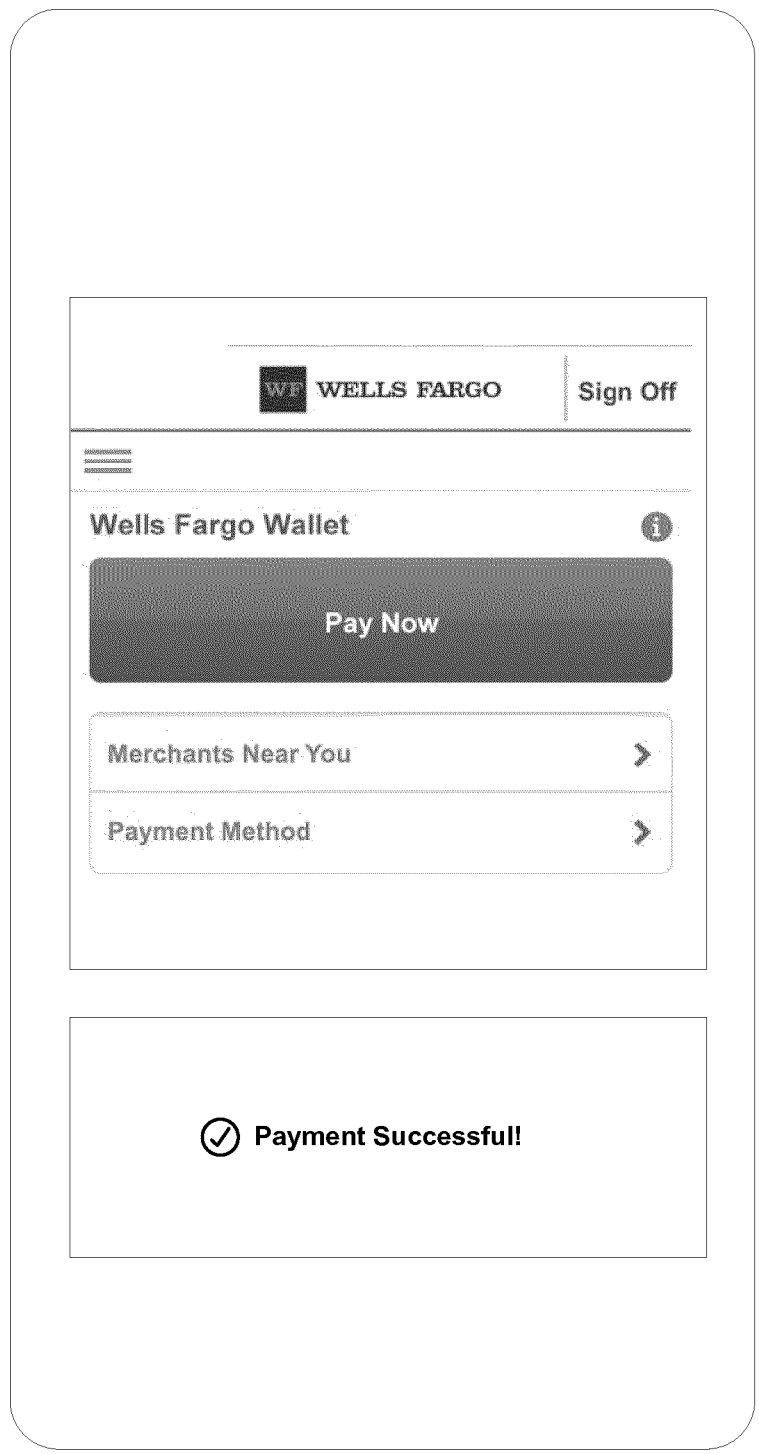

Process 400 further includes receiving an indication that the user wishes to execute a payment or other transaction (step 412). Upon the indication, the mobile wallet bank computer system 120 generates a code (e.g., a QR code) based on the user's default payment method (step 414). For example, FIG. 4C shows a QR code 431. The QR code is generated including a combination of random digits and account information of the user. For example, the QR code may include the last four digits of a debit card or credit card number of an account associated with the user and the request. The account information may be used to identify a source account for the transaction at a later step in the transaction. The mobile wallet bank computer system 120 may use token information (e.g., customer token and device token information) from the mobile device to identify the mobile wallet account and associated source account to use in code generation. The code may provide credit card data or tokenized credit card data in Track 1 or Track 2 format, as described below with reference to FIGS. 5-7. In FIG. 4C, on the same screen as QR code 431 is displayed, a Pay Now button 433 is also displayed. Selection of the Pay Now button 433 is the last input received by the mobile device from the user before the payment is submitted for processing. Upon user selection of the Pay Now button 433, the generated code is then provided as part of a payment token to the merchant or other recipient of the payment or funds for payment processing (step 416) (FIG. 4D).

As previously described in connection with FIGS. 3C and 3F, the user may be provided with information about current account balances. This is shown in FIG. 4C at field 331. The balance information is displayed on the same display screen upon which the Pay Now button 433 is displayed. As previously indicated, the Pay Now button 433 is the last input provided by the user before the payment information (e.g., tokenized card number) is submitted to the merchant computer system 140 for payment processing. Hence, in FIG. 4C, the user is provided with account balance information at the same time the user is making a final decision on whether to select the Pay Now button 433 (i.e., at the same time the user is making a final decision on whether to submit the payment to the merchant). The account balance may be accessed from database 124 or 134 and may reflect all account activity that has posted to the account, even for transactions that are quite recent. After the transaction is complete, another screen display may be generated that shows updated account balance information after the funds are transmitted to the recipient.

If the user is concerned that the account balance would be unacceptably low after the transaction is completed, or if the account has a negative balance, then the user can opt to cancel the transaction or to perform the transaction in a different manner. For example, if the user is a first joint account holder, and a second joint account holder on the same account (e.g., a spouse) makes an unrelated purchase at another store, such account activity may be reflected on a screen display viewed by the user within a short period of time of the purchase by the other joint account holder (e.g., less than one hour, less than ten minutes, less than one minute, etc.). Hence, if the user did not realize how low the account balance is getting, and is concerned that the account balance would be unacceptably low after the transaction is completed, then the user can opt to cancel the transaction or to perform the transaction in a different manner (e.g., using another source account, by adding funds in the default source account, and so on). If the source account is held at the same entity that operates the mobile wallet computer system 120, then the account balance may be obtained without the use of bots or other program logic for performing automated tasks over the Internet. Conversely, if the source account is held at a different entity than the entity that operates the mobile wallet computer system 120, then other mechanisms may be used. For example, two banks may collaborate to establish a protocol for securely exchanging customer account balance information.

Also shown in FIG. 4C is a balance information link 437. By selecting link 437, the user can obtain more detailed balance information and perform related tasks. For example, in some instances, the account balance on the default payment account used by the user may be negative. For example, a demand deposit serving as a source account may be overdrawn or a credit card account serving as a source account may have negative available credit. By selecting link 437, the user may be provided with a new display screen that presents additional information and options for the user. For example, if there is a negative account balance, the user may be provided with a link to select a different account to use as the source account. For example, the user may be provided with a list of other accounts, and be presented with current balance information for each of the other accounts, and be provided with the option to select one of the other accounts to use as the source account. The funds may then be transmitted from the newly selected account. Alternatively, the user may be provided with a link to transfer funds to another account to the default source account. In the case of a credit card account, the user may be provided with a link to pay off all or a portion of the balance of the credit card account.

As previously mentioned in connection with FIG. 3G, in some embodiments, the mobile wallet computer system 120 may be configured to select the source account that is presented to the user as the default payment account. The source account may be selected by the mobile wallet computer system 120 when the user is at the point of sale based on user preferences, account balances, and/or other information. For example, if two accounts have been provisioned to the mobile wallet, such as a demand deposit account and a credit card account, the mobile wallet may select the source account based on current account balances. For example, if the user only has $100 in the demand deposit account, and the proposed transaction is for $250, then the mobile wallet computer system 120 may select the credit card account as the default source account to be presented to the user at the point of sale, because the available account balance of the demand deposit is deemed too low. For example, in this example, using the demand deposit account as the source account would cause the demand deposit account to become overdrawn. In other examples, the user may specify a dollar threshold such that, if a transaction were to cause the account balance to drop below the threshold, the available account balance is deemed too low (even though the transaction would not cause the available account balance to become negative). As another example, if the demand deposit account has a $500 balance, and the credit card has a balance of $9,800 and a credit limit of $10,000, then the mobile wallet computer system 120 may select the demand deposit account as the default source account to be presented to the user at the point of sale, because there is not sufficient credit available on the credit card account to perform the transaction. Again, the user may be provided with the ability to specify a dollar threshold which causes the available credit to be deemed too low (e.g., even though the user has a credit limit of $10,000, the user may want to never have an outstanding balance over $5,000). The user may also be provided with the ability to view account balances and transfer funds, as previously described, such that an account other than the default source account selected by the mobile wallet computer system 120 may be used.

As another example, the mobile wallet computer system 120 may determine rewards information regarding rewards available to the user if the user uses a first potential source account to perform the transaction as compared to if the user uses a second potential source account to perform the transaction. For example, the user may have two credit cards, but one of the credit cards may offer additional rewards points for purchases made at a particular merchant with whom the user is about to conduct a transaction. For example, the credit card may be a closed loop credit card (i.e., a merchant-specific credit card) that offers more rewards points for purchases at that merchant than the open loop credit card (e.g., a Visa card) that is typically used by the user. A screen display may be generated that shows at least one of the first and second rewards information. For example, the screen display may shows a comparison of the available rewards. The default source account may thus be selected based on which credit card offers greater rewards for the particular transaction that the user is about to conduct.

As another example, the mobile wallet computer system 120 may select a default source account based on user preferences. For example, the user may have two credit cards as described above, including a merchant-specific credit card and a Visa credit card. The merchant specific credit card may offer greater rewards but have a higher interest rate than the Visa credit card. A first user may specify a preference for rewards points (e.g., if the user typically pays off the user's credit cards every month). For such a user, the merchant-specific credit card may be selected as the default source account by the mobile wallet computer system 120 when a user is at a point of sale of that merchant. A second user may specify a preference for lower interest rates (e.g., if the user typically does not pay off the user's credit cards every month). For such a user, the open loop credit card may be selected as the default source account by the mobile wallet computer system 120 when a user is at a point of sale of that merchant. As another example, the mobile wallet computer system 120 may perform an analysis of recent payment history of the user to determine whether the user has recently been paying off the user's credit cards and, based on recent payment history, select either the merchant-specific credit card or the open loop credit card for use in a particular transaction.

As another example, a user may have provisioned gift cards to the mobile wallet account. For example, the user may have purchased a $25 virtual gift card using rewards points that the user has earned. At the merchant point of sale, the virtual gift card may then be presented to the user as a default source account.

Other information may also be displayed to the user. For example, if the user has configured budget information through an online banking area of a website of the financial institution, a screen display may be generated that shows the budget information configured by the user (e.g., prior to the user selecting the Pay Now button 433). Again, the budget information may reflect recent transactions performed in connection with the user's accounts.

Referring to FIGS. 5-6, codes that may be sent during operation of the system 100 are shown. As previously indicated, information embedded in the codes may be embedded in a Track 1 format and Track 2. The code may be sent optically as a code or in another manner. As will be appreciated, the code formats shown in FIGS. 5-6 are example code formats that may be used with the systems and methods described herein. In other embodiments, other formats may be used.

The Track 1 format in FIG. 5 is shown to include 76 digits and the Track 2 format in FIG. 6 is shown to include 38 digits. Each format may generally include a format code (digit 1), tokenized primary account number 501 (digits 2-20), a field separator (digit 21), an expiration date 505 (digits 35-38 in Track 1, digits 22-25 in Track 2), a service code (digits 39-41 or 26-28), and a payment token 507 (digits 42-76 or 29-38). Each track may additionally or alternatively include other fields representing different data to be embedded in the code. In one embodiment (the Track 1 format), the credit card data may include a customer name or other customer identifier (e.g., in digits 22-33 of the Track 1 format).

In various embodiments of the present disclosure, account information associated with the user's mobile wallet account may be represented in the code using digits 2 through 20 of the Track 1 or Track 2 format. This is shown in FIGS. 5-6 as the tokenized primary account number (TPAN). Referring also to FIG. 8, the TPAN format is shown in greater detail.

As shown in FIG. 7, the first six digits of the TPAN may represent an issuer identification number (IIN) that is used to route the TPAN to the appropriate mobile wallet bank computer system 120. The IIN is a predetermined number issued to each bank for financial institution for routing fund transfer requests. In the present configuration, an IIN that is associated with the bank that operates the mobile wallet computer system 120 may be used.

Digits 7 through 15 of the TPAN may represent a Trace ID, and digits 16 through 19 may represent account information (e.g., the last four digits of an actual account number, or other account information). First generating random numbers for digits 7 through 14 may create the Trace ID. The Trace ID may be used for verifying and approving a user initiated transaction. Once those digits are determined, then digit 15 may be calculated. Digit 15 is calculated such that digit 19 may be used as the checksum digit of the tokenized card number or the code. In other words, even though digit 19 is fixed (as part of the actual card number of the account), digit 19 may be used as the checksum digit, because digit 15 is calculated in such a way to allow the code to pass the error detection process. Digits 1-19 from FIG. 7 map to digits 2-20 in FIGS. 5 and 6. For example, digits 2-20 of FIGS. 5 and 6 may include the IIN, Trace ID, pseudo check digit, last 4 digits of the card number as shown in FIG. 7.

The checksum digit is used for error detection purposes (e.g., to detect errors in manually inputted data that is included in the code). For example, the checksum digit is used to help detect single digit errors, errors where digits are transposed, twin errors, etc. The checksum digit may then be used in one of several algorithms for checking for errors in the code. It should be appreciated that one of any type of checksum algorithm may be used with the embodiment described herein.

In other embodiments, a digit other than digit 15 may be used as the calculated digit. For example, any eight of the nine digits between digit 7 and 15 may be randomized, and the remaining digit may be used as the "checksum helper" digit (e.g., the digit calculated to make digit 19 the checksum digit).

Referring also to FIG. 8, actual card number is sent in Track 2 format that may be generated at step 810 is shown in greater detail. As compared to the QR code of FIGS. 5-7, the trace ID is moved to digits 26-33, and the actual account number may be provided as digits 2 through 17. In other words, a subset of the original token generated by the mobile wallet bank computer system is moved into a discretionary field of the new generated token. The code is shown to generally include the trace ID and account number, along with an expiration date field (e.g., with the same digits as determined in an earlier process of creating the original token) and a service code field. The code may optionally include any other type of information.

In various embodiments, using the trace ID may allow the financial institution to identify mobile wallet transactions. Upon identifying the mobile wallet transactions, the financial institution may segment the mobile wallet transactions for risk, customer service, security, and card not present transactions. In other embodiments, the transactions that were performed using mobile wallet bank computer system 120 each use a trace identification number and the user may be charged a different fee for such transactions. In various embodiments, when a user of a mobile wallet account loses their credit card or debit card and the financial institution issues the user a new credit card or debit card, the mobile wallet may be able to auto provision the newly issued cards. Auto provisioning may allow the user to use the mobile wallet account prior to receiving and/or activating the credit or debit card. In other embodiments, in the case of mobile wallet fraud, the mobile wallet account of the user may be reset.

A credit card may be used to pay for a transaction at a point of sale location using the physical credit card, known as a credit card present transaction. A credit card may be used when a credit card is not physically located at a merchant location, such as but not limited to, an online merchant transaction where the credit card information is entered in an online transaction. A financial institution may rank the risk of fraud for each type of transaction. In some embodiments, the financial institution may assign a higher risk rating to a credit card that is not present at the merchant location than a credit card present transaction. In various embodiments, a mobile wallet that performs a transaction at a merchant location may be considered more secure than a physical credit card because the mobile wallet does not provide the merchant the actual credit card number and the mobile wallet does not have the actual credit card number. Accordingly, the financial institution may determine that a transaction was a mobile wallet transaction based on the trace ID and rate the transaction to be more secure or fraud resistant than card present transaction. The financial institution may create a new risk rating that is of a lower risk for mobile wallet transactions. In some embodiments, the transactions that are performed using a mobile wallet may be charged different fee because of the risk rating. In various embodiments, due to the reduction of risk the mobile wallet transactions may be charged a lower fee than card present or card not present transactions.

Figure 9:
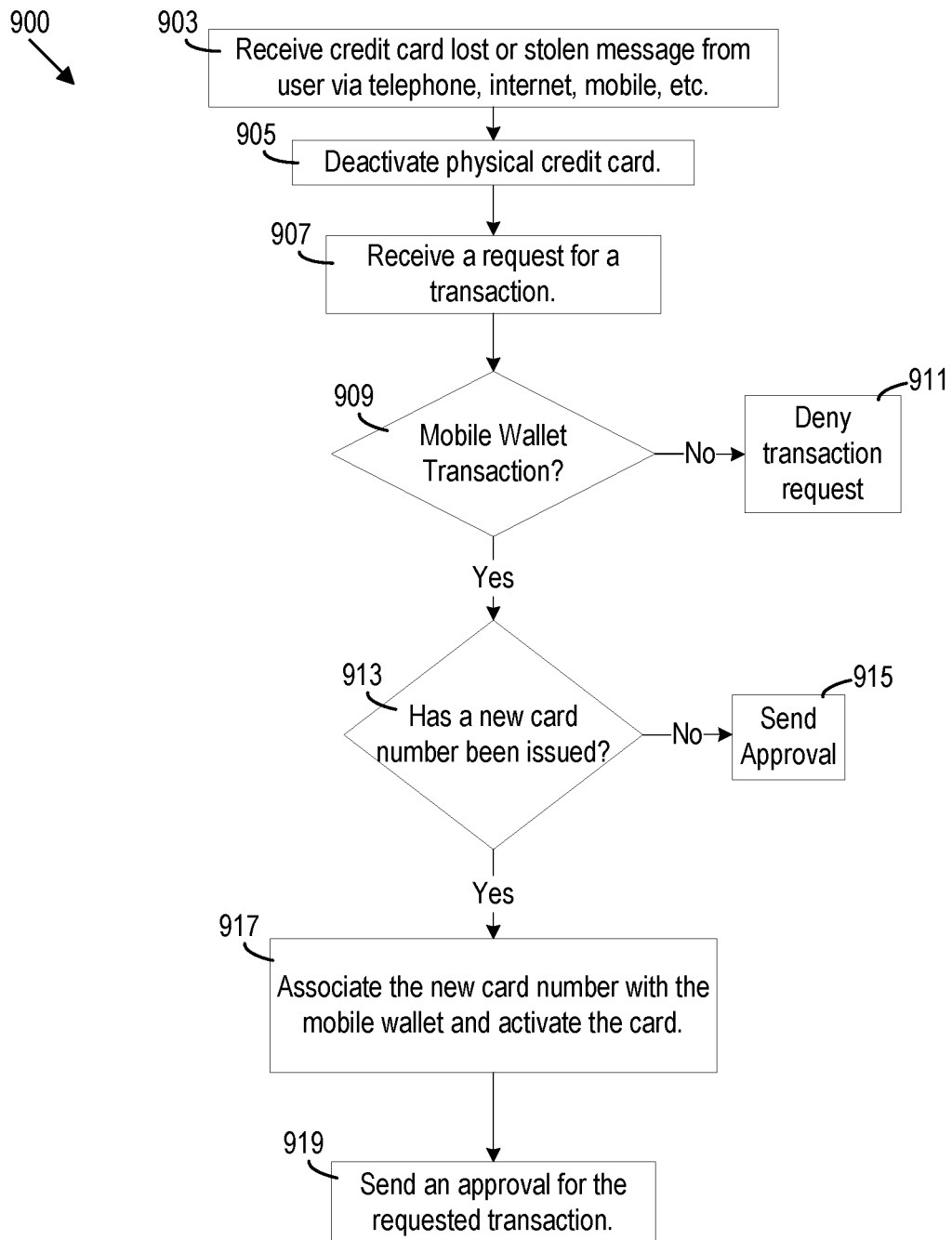
FIG. 9 illustrates a process that may be implemented by the system in FIG. 1 according to an example embodiment.

FIG. 9 illustrates a process 900 that may be implemented by the system in FIG. 1. In various embodiments, process 900 may be used when an account holder reports their physical card lost or stolen via telephone, Internet, mobile device, etc. In some embodiments, process 900 may allow the account holder to perform one or more transactions using the mobile wallet stored on a mobile device, even after the physical card has been lost or stolen. Some advantages of process 900 may include the account retaining the use of the account even after the loss of a physical card. Additional advantages may include the account holder being able to activate the newly issued replacement card by using the mobile wallet functionality.

At step 903, the financial institution computer system may receive a message from the user that the physical card is lost or stolen. In various embodiments, the account holder may contact the financial institution computer system using various communication methods, such as but not limited to, telephone, Internet, and mobile device. Upon receiving the message from the account holder that the physical card is lost or stolen, the financial institution computer system may ask the account holder whether the mobile wallet account has also been compromised. After receiving input from the account holder that the mobile wallet account holder has not been compromised, the financial institution computer system may deactivate the physical card account, at step 905. In some embodiments, the financial institution computer system may assign the uncompromised mobile wallet account to a temporary account to allow the account holder to conduct transactions using the mobile wallet.

In various embodiments, the financial institution computer system may receive a request for a transaction from a merchant, at step 907. At step 909, the financial institution computer system determines whether the transaction is being performed by a mobile wallet or whether the transaction is being performed by the physical card information. Since the mobile wallet transaction is performed using at least a trace ID, the financial institution computer system may differentiate between the mobile wallet transaction and the physical card information transaction.

Upon determining that the transaction request is not from a mobile wallet or is using the actual card information, the financial institution computer system may deny the transaction request, at step 911. The financial institution computer system would be able to avoid any fraudulent transactions using the actual card information by denying the transaction request that did not originate from a mobile wallet associated with the account.

When the financial institution computer system determines that the transaction request originated from a mobile wallet account, the financial institution may determine whether a new replacement card number has been issued to the account holder at step 913. If a new replacement card number has not been issued, the financial institution may approve the transaction at step 915 based on the determination that the transaction is a mobile wallet transaction and based on the fact that the mobile wallet account has not been compromised. In some embodiments, the transaction may be approved using the temporary card number discussed above.

In various embodiments, when the financial institution has issued a new card, but account holder has not activated the physical card because the account holder has not received the card or other reasons, the financial institution may update its records with respect to the mobile wallet. For example, at step 917, the financial institution computer system may update its records to associate the new card number with the mobile wallet account of the previous card number at step 917. After step 917, the financial institution may send an approval for the transaction request at step 919. In other embodiments, the mobile wallet client application on the mobile device 110 may prompt the user to activate the card prior to the user having received the physical card. In other embodiments, even after receiving the card the account holder may wish to activate the card via the mobile wallet application. Activating the card by the account holder, may update the financial institution settings to associate the new card number with the mobile wallet account number.

Figure 10:
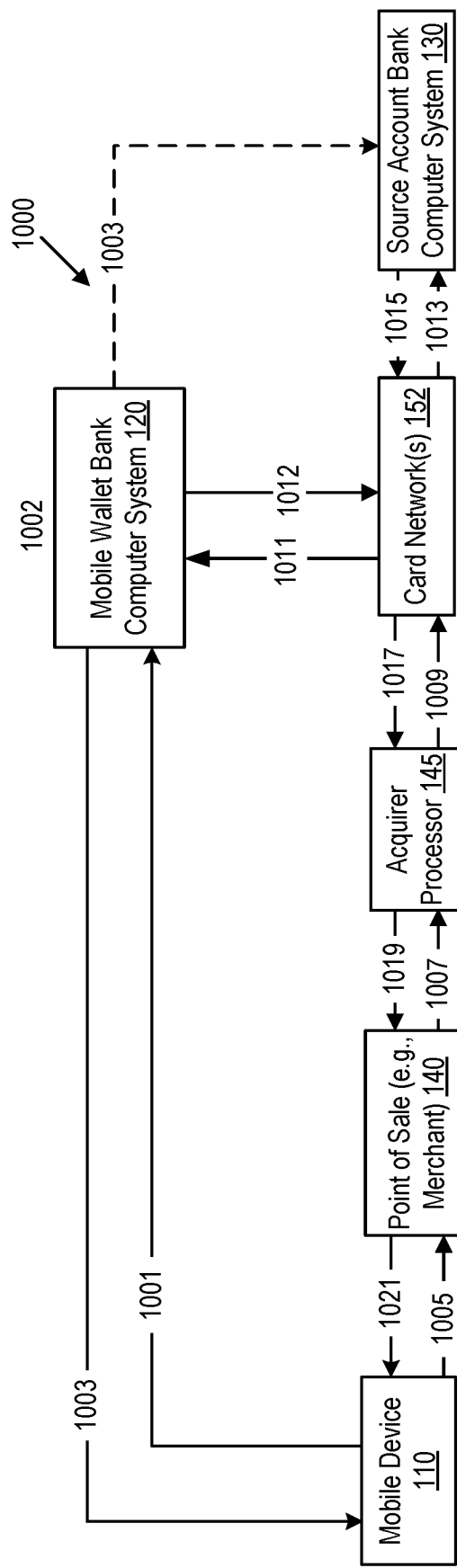
FIG. 10 illustrates a payment process that may be implemented by the system in FIG. 1 according to an example embodiment.

FIG. 10 illustrates a payment process that may be implemented by the system in FIG. 1 according to an example embodiment. Except as otherwise described below, the payment process of FIG. 10 is the same as the payment process of FIG. 2. Hence, the above discussion with respect to FIG. 2 applies to FIG. 10 as well, except as otherwise described below.

In the embodiment of FIG. 10, rather than providing the substitute card number to the mobile wallet computer system 120 (as in FIG. 2), the acquirer processor computer system 145 provides the substitute card number to a card network computer system 152. Hence, a tokenized card number may be generated and ultimately delivered to the acquirer processor computer system 145 at steps 1001, 1003, 1005, 1007 in the manner described above in connection with steps 201, 203, 205, 207.

Next, at step 1009, the acquirer processor computer system 145 sends the tokenized card number to the card network computer system 152. Next, at step 1011, the card network computer system 152 sends the tokenized card number to the mobile wallet bank computer system 120. After receiving the request from the card network computer system 152, the mobile wallet bank computer system 120 may determine the actual card number and send the actual card number back to the acquirer processor at step 1012. In one embodiment, the determination of the actual card number may occur by searching for the account information associated with the payment token and/or trace ID within the tokenized card number. Additionally, the trace ID from the tokenized card number may be sent with the actual card number at step 1012, similar to step 211. Again, at this point, the issuer discretionary field is no longer needed for the payment token, hence, the trace ID may be sent to the acquirer processor computer system 145 in the issuer discretionary field.

At step 1013, the card network computer system 152 sends the actual card number and the trace ID to the source account computer system 130 for processing a payment. The source account bank computer 130 may retrieve the trace ID that was received from the mobile wallet bank computer system 120 by searching for the actual card number that was received from the payment system 150. The source account bank computer 130 may compare the trace ID that was received/stored at step 1003 with the trace ID that was received from the payment system 150 at step 1013. Assuming there is a match, the source account bank computer 130 may issue an approval for the transaction. After verifying the actual card number and the trace ID in the issuer discretionary field, the source account bank computer system 130 may send an approval to the payment system 150 at step 1015. Steps 1017, 1019, and 1021 may be performed in the same manner as discussed above in connection with steps 217, 219, and 221.

As discussed above in connection with FIG. 2, the use of the payment token and trace ID as described herein allows for two levels of authentication. The payment token is generated by the mobile wallet computer system at step 1002. The payment token is then transmitted to the mobile device 110, then to the merchant computer system 140, then to the acquirer processor computer system 145, then to the card network computer system 152, and eventually back to the mobile wallet computer system 120 where it is matched with the original payment token generated at step 1002. Similarly, the Trace ID is also generated by the mobile wallet computer system at step 1002, and then transmitted to the mobile device 110, then to the merchant computer system 140, then to the acquirer processor computer system 145, then to the card network computer system 152, and eventually back to the mobile wallet computer system 120 where it is matched with the Trace ID generated at step 1002. In the case of the Trace ID, however, the Trace ID is then further transmitted back to the payment system 150, and then to the source account computer system 130 where it is matched with the Trace ID generated at step 1002. Accordingly, the trace ID used in conjunction with the tokenized credit card number allows both the mobile wallet bank computer system 140 and the source account bank computer system 130 to authenticate the transaction. Using the trace ID in the above described manner may permit the source account bank computer system 130 and the mobile wallet bank computer system 120 to verify the trace ID at least twice prior to approving a transaction and transferring funds. Further, as previously discussed, the trace ID may be used by the source account computer system 130 to determine whether the credit card transaction was a mobile wallet transaction (e.g., as opposed to an in-person card-present transaction involving use of the user's physical credit card, as opposed to an online transaction, and so on). In other embodiments, the mobile wallet computer system 120 generates a tokenized card number, but does not embed a trace ID in the tokenized card number.

In some embodiments, instead of embedding the trace ID in a tokenized credit card account number at step 1002, the actual credit card number is transmitted to the mobile device 110 and the merchant computer system 140. In such an embodiment, the trace ID may be included in the issuer discretionary field at step 1002, and the payment token may be communicated in another manner or another payment matching mechanism may be used. The trace ID may be stored in the issuer discretionary field and may travel though the payment processing system, until it is verified by the source account bank computer system 130. After being verified by the source account bank computer system 130, the transaction may be approved and the funds may be transferred from the source account bank computer system to the acquirer processor computer system 145. In other embodiments, the same financial institution may own the source account bank computer system 130 and the mobile wallet bank computer system 120. Hence, as previously described in connection with the discussion of FIG. 2, the tokenized card account number and trace ID features may each be used alone or in combination with each other.

Figure 11:
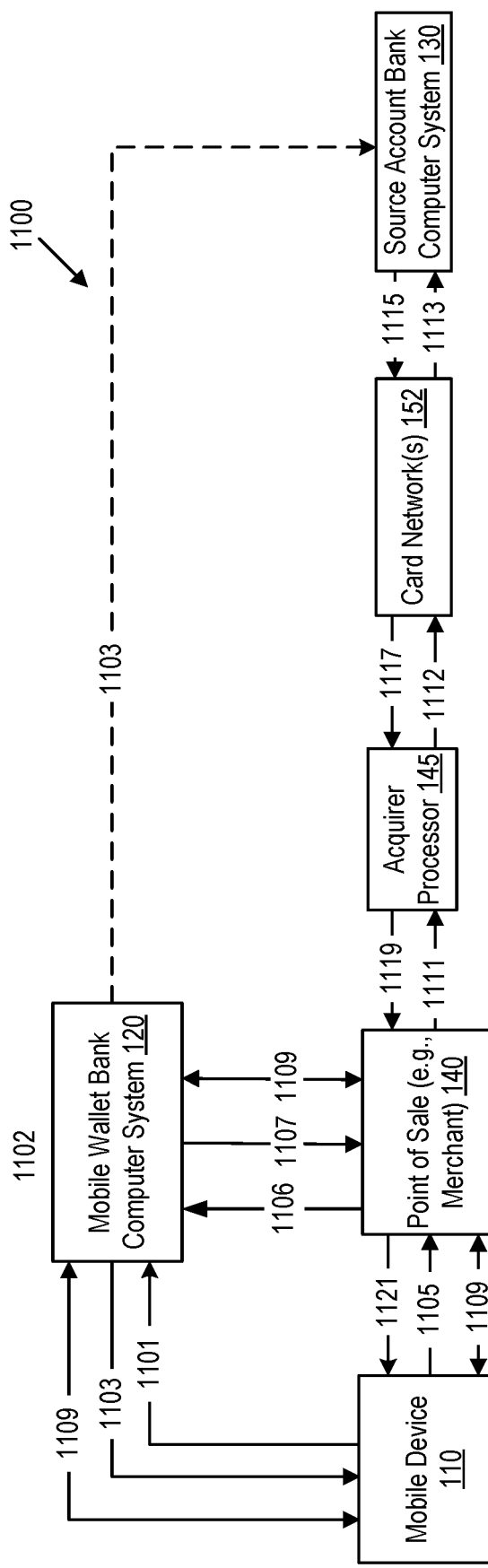
FIG. 11 illustrates a payment process that may be implemented by the system in FIG. 1 according to an example embodiment.

FIG. 11 illustrates a payment process that may be implemented by the system in FIG. 1 according to an example embodiment. Except as otherwise described below, the payment process of FIG. 11 is the same as the payment process of FIG. 2. Hence, the above discussion with respect to FIG. 2 applies to FIG. 11 as well, except as otherwise described below.

In the embodiment of FIG. 11, rather than providing the substitute card number to the acquirer processor computer system 145 (as in FIG. 2), the merchant computer system 140 provides the substitute card number to the mobile wallet computer system 120. Hence, a tokenized card number may be generated and ultimately delivered to the merchant computer system 145 at steps 1101, 1103, 1105 in the manner described above in connection with steps 201, 203, 205.

Next, at step 1106, the merchant computer system 140 sends the tokenized card number to the mobile wallet computer system 120. After receiving the tokenized card number from the merchant computer system 140, the mobile wallet bank computer system 120 may determine the actual card number and send the actual card number back to the merchant computer system 140 at step 1107. In one embodiment, the determination of the actual card number may occur by searching for the account information associated with the payment token and/or trace ID within the tokenized card number. Additionally, the trace ID from the tokenized card number may be sent with the actual card number at step 1107, similar to step 211. Again, at this point, the issuer discretionary field is no longer needed for the payment token, hence, the trace ID may be sent to the acquirer processor computer system 145 in the issuer discretionary field.

At step 1111, the merchant computer system 140 sends the actual card number and the trace ID to the acquirer processor computer system 145. At step 1112, the acquirer processor system 145 sends the actual card number and the trace ID to the card network computer system 152. At step 1113, the card network computer system 152 sends the actual card number and the trace ID to the source account computer system 130 for processing a payment. The source account bank computer 130 may retrieve the trace ID that was received from the mobile wallet bank computer system 120 by searching for the actual card number that was received from the payment system 150. The source account bank computer 130 may compare the trace ID that was received/stored at step 1103 with the trace ID that was received from the payment system 150 at step 1113. Assuming there is a match, the source account bank computer 130 may issue an approval for the transaction. After verifying the actual card number and the trace ID in the issuer discretionary field, the source account bank computer system 130 may send an approval to the payment system 150 at step 1115. Steps 1117, 1119, and 1121 may be performed in the same manner as discussed above in connection with steps 217, 219, and 221.

In the same manner as discussed above in connection with FIG. 2, the use of the payment token and trace ID as described herein allows for two levels of authentication. Specifically, the payment token generated by the mobile wallet computer system at step 1102 is matched with the payment token received by the mobile wallet computer system at step 1107. Additionally, the Trace ID generated by the mobile wallet computer system 120 at step 1002 is matched by the mobile wallet computer system 120 with the Trace ID received at step 1107 and is also matched by the source account computer system 130 with the Trace ID received at step 1113. Also, as previously described in connection with the discussion of FIGS. 2 and 10, the tokenized card account number and trace ID features may each be used alone or in combination with each other.

Also shown in FIG. 11 is step 1109. In some embodiments, at step 1109, the mobile device 110, the mobile wallet computer system 120, and the merchant computer system 140 interact to facilitate redemption of the merchant rewards points. Such an arrangement may allow the rewards information to be available at the point of sale (i.e., at the time and location of the transaction), such that the impact on the transaction of redeeming such rewards may be presented to the user at the point of sale and prior to when the purchase is made. For example, if the user has $25 in merchant rewards points, settlement of the rewards points may occur entirely at the point of sale (i.e., the $25 may be deducted from the transaction at the point of sale), rather than only appearing as a credit at a later point in time on an account statement. Additionally, the settlement may occur at the point of sale even though the user does not have a physical rewards card (e.g., gift card, prepaid card) to provide the merchant at the point of sale.

For example, in a scenario where the source account is held at the same entity that operates the mobile wallet computer system 120, the mobile wallet computer system 120 may have information about rewards that have been earned by the user. For example, the user may earn cash back rewards for use of a credit card that are calculated as a percentage of credit card transactions. The mobile wallet bank may then partner with merchants to provide rewards offers to the user. For example, the user may be provided with an offer to purchase a $25 virtual gift card at a local merchant for $22.50 in rewards points. The virtual gift card may be $25 in merchant rewards points that the user can access, e.g., through the mobile wallet, but wherein no physical gift card issued. If the user accepts such an offer, then the fact that the user has a $25 virtual gift card available to spend may be information that is stored in the mobile wallet computer system 120. As another example, the user may earn rewards from the merchant as a percentage of purchases made at the merchant. Such rewards information may be communicated to the mobile wallet computer system 120 by the merchant computer system 120. For example, the $25 virtual gift card may be automatically presented to the user as a default source account when the user is at the merchant point of sale. As another example, if the source account is held at a different entity than the entity that operates the mobile wallet computer system 120, then other mechanisms may be used to obtain such rewards information from the source account bank (e.g., bots, a secure exchange protocol established through collaboration of the two banks, etc.).

Subsequently, at the point of sale, the mobile wallet bank computer system 120 may determine whether the user has any rewards available for the merchant with whom the transaction is being conducted. Alternatively, if the user does not have any rewards with the merchant, the mobile wallet computer system 120 may initiate a direct communication with the mobile device 110 to inquire whether the user would like to purchase any rewards points at the point of sale. Hence, the user may be provided with the opportunity to purchase merchant rewards points while at the merchant point of sale, and then immediately use those rewards points while the user is still at the merchant point of sale.

Assuming the user has rewards points that may be used with the mobile device 110, the mobile wallet computer system 120 and the merchant computer system 140 may then interact to facilitate redemption of the merchant rewards points. This interaction is shown generally at 1109. As will be appreciated, the particular manner in which the mobile device 110, the mobile wallet computer system 120 and the merchant computer system 140 interact in this regard may vary according to various embodiments. As will also be appreciated, and as with the other steps shown in the figures, the timing and sequencing of step 1109 relative to the other steps may vary according various embodiments.

For example, in some embodiments, step 1109 is performed after step 1107. For example, the tokenized card number may initially be submitted to the mobile wallet computer system 120 after the Pay Now button 433 (FIG. 4C) is selected by the user. After the mobile wallet computer system 120 determines that there are available rewards, and communicates this information to the merchant computer system 140, the merchant computer system 140 may then interact with the mobile device 110. For example, the merchant computer system 140 may prompt the user via a screen display with a statement such as the following: "You have $25 in merchant rewards available to use for your purchase? Would you like to redeem your rewards now?" Assuming the user answers affirmatively, then the merchant computer system 140 may apply the $25 merchant rewards points to the transaction, and submit the updated transaction (having a reduced transaction amount) to the acquirer processor computer system 145. As another example, the user may select via a display screen on the mobile device 110 to have only a portion (e.g. $10) of the available rewards applied to the transaction. As another example, the mobile wallet computer system 120 may provide the prompt to the user. Upon the user answering affirmatively, the mobile wallet computer system 120 may provide information about the rewards points redemption to the merchant computer system 140 (e.g., the fact that the user has merchant rewards points and the amount of the points). As another example, the rewards information may be communicated from the mobile device 110 to the merchant computer system 140, and then validated later by the merchant computer system 140 and/or the mobile wallet computer system 120.

As another example, in some embodiments, step 1109 may be performed before step 1105. For example, at step 1101, when the mobile device 110 requests access to funds in the mobile wallet via the mobile wallet bank computer system 120, the mobile device 110 may also provide the mobile wallet computer system 120 with the geolocation of the user. Based on the geolocation, the mobile wallet computer system 120 may identify the merchant with whom the user is attempting to conduct a transaction. The mobile wallet computer system 120 may then determine whether merchant rewards points are available and prompt to the user whether the user wishes to utilize the merchant rewards points. Then, at step 1105, in addition to communicating the tokenized card number, the mobile device 110 may also communicate information about the dollar value of the merchant rewards points to be redeemed. In some embodiments, the user is not prompted regarding whether the user wishes to utilize the merchant rewards points, rather, the merchant rewards points are redeemed automatically without additional user input.

When the transaction is complete, the user may be provided with information regarding the redemption of the rewards points. For example, a screen display may be generated that shows a first total transaction amount before the merchant rewards are applied and a second total transaction amount after the merchant rewards are applied. The merchant computer system 140 may also generate a receipt for the transaction and transmit the receipt to the mobile device 110 for display to the user. The receipt may show application of the rewards to the transaction.

For example, if the original transaction amount was $75.45, and the user had $25 in rewards, the receipt will reflect a transaction amount of $50.45 and not 75.45, even though no physical rewards card is presented to the merchant. Additionally, the transaction amount submitted to the card network computer system 152 is $50.45 and not $75.45 (rather than $75.45 being submitted and final settlement of the rewards points occurring at a later point in time). Additionally, on the user's account statement, the user will see only a debit for $50.45 on the date of the purchase, rather than a debit of $75.45 on the date of the purchase followed by a credit of $25 at a later date.

In one embodiment, the merchant computer system 140 comprises a smart point of sale device (e.g., Clover, Square, Revel Systems, Poynt, etc.). Such a device may be built on an Android-based or other platform and may provide third-party software developers (such as banks) with the ability to provide custom applications available to merchants through an "app store"). Such a device may be connected to the internet and may be configured to permit over-the-air updates performed, such that new functionality can be downloaded on a regular basis. In other embodiments, other POS computer system platforms may be utilized.

In the embodiment of FIG. 11, the merchant computer system 140 sends the tokenized card number to the mobile wallet computer system 120 at step 1106. As will be appreciated, in other embodiments, the merchant computer system 140 may interact with the mobile wallet computer system 140 and the mobile device 110 as described above in FIG. 11 in connection with rewards information, but the tokenized card number may be sent to the mobile wallet computer system by the acquirer processor computer system 145 (as described in connection with FIG. 2) or by the card network computer system 152 (as described in connection with FIG. 10).

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method, comprising:
   generating, by a mobile device, a customer token that identifies a user of the mobile device, wherein the customer token is separate from a user provided login credential for a mobile wallet application on the mobile device;
   generating, by the mobile device, a device token comprising encrypted device information that identifies the mobile device and a current mobile wallet application session of the user;
   receiving, by the mobile device, the user provided login credential for the mobile wallet application;
   transmitting, by the mobile device, the customer token, the device token, and the user provided login credential to a server system that verifies each for a mobile wallet transaction performed via the mobile wallet application;
   receiving, by the mobile device, a payment token associated with the mobile wallet transaction based on the verification of the customer token, the device token, and the user provided login credential for the mobile wallet application;
   receiving, by the mobile device, a screen display to present to the user, the screen display comprising account balance information for an account held by a user at a financial institution;
   receiving, by the mobile device via the server system, a determination of rewards information regarding rewards available to the user if the user uses the account to perform the transaction, wherein the screen display comprises the rewards information;
   prompting, by the mobile device, the user to purchase rewards for the mobile wallet transaction while at a physical point of sale associated with a merchant;
   receiving, by the mobile device, an indication to purchase rewards for the mobile wallet transaction while at the physical point of sale associated with the merchant; and
   providing, by the mobile device, an indication regarding performance of the mobile wallet transaction with the merchant by showing a cost of the mobile wallet transaction after application of the purchased rewards.

2. The computer-implemented method of claim 1, wherein the rewards information comprises at least one of first or second rewards information, and wherein a screen display comprising the at least one of the first or second rewards information is provided to the user.

3. The computer-implemented method of claim 2, wherein
   the screen display comprises the first and the second rewards information and a comparison of the first and the second rewards information.

4. The computer-implemented method of claim 1, wherein the rewards information is presented at or near the time of the mobile wallet transaction.

5. The computer-implemented method of claim 1, wherein the customer token and device token identify the user and the mobile device respectively.

6. The computer-implemented method of claim 1, wherein the account comprises a default source account selected based on which credit card is associated with a greater rewards value for the mobile wallet transaction.

7. The computer-implemented method of claim 1, wherein the account comprises a default source account selected based on at user preference for the mobile wallet transaction.

8. The computer-implemented method of claim 1, wherein the account comprises a default source account selected based on a virtual gift card corresponding to rewards points.

9. A system comprising:
a server system comprising a processor and instructions stored in non-transitory machine-readable media; and
a mobile wallet circuit communicatively coupled to the server system, the mobile wallet circuit configured to:
generate a customer token that identifies a user of the mobile device, wherein the customer token is separate from a user provided login credential for a mobile wallet application on the mobile device;
generate a device token comprising encrypted device information that identifies the mobile device and a current mobile wallet application session of the user;
receive the user provided login credential for the mobile wallet application;
access account balance information for an account held by a user at a financial institution;
transmit the customer token, the device token, and the user provided login credential to the server system that verifies each for a mobile wallet transaction performed via the mobile wallet application;
receive a payment token associated with the mobile wallet transaction based on the verification of the customer token, the device token, and the user provided login credential for the mobile wallet application;
receive a screen display to present to the user, the screen display showing the account balance information for the account held by the user at the financial institution;
receive, via the server system, a determination of rewards information regarding rewards available to the user if the user uses the account to perform the transaction, wherein the screen display comprises the rewards information;
prompt the user to purchase rewards for the mobile wallet transaction while at a physical point of sale associated with a merchant;
receive an indication to purchase rewards for the mobile wallet transaction while at the physical point of sale associated with the merchant; and
provide an indication regarding performance of the mobile wallet transaction with the merchant by showing a cost of the mobile wallet transaction after application of the purchased rewards.

10. The system of claim 9, wherein a mobile device comprises the mobile wallet circuit.

11. The system of claim 9, wherein the mobile wallet circuit establishes a connection with the server system to receive and store the device token and the customer token on the mobile device.

12. The system of claim 9, wherein the account is a demand deposit account, a credit card account, a savings account or a line of credit.

13. The system of claim 9, wherein the indication regarding performance of the mobile wallet transaction is received via the same screen display comprising the account balance information, and wherein the indication is the last input received by the mobile device from the user prior to transmission of an account number to a merchant computer system.

14. The system of claim 9, wherein the funds are transmitted from the account of the user held at the financial institution.

15. The system of claim 9, wherein the account is a first account held by the user, and wherein the server system is configured to:
determine that the user has insufficient funds available in the first account to perform the transaction; and
provide the user with a link to transfer funds to the first account from a second account.

16. The system of claim 9, wherein the account is a first account held by the user, wherein the screen display is a first screen display, and wherein the server system is configured to:
determine that the user has insufficient funds available in the first account to perform the transaction; and
generate a second screen display to present to the user via the mobile device, the second screen display showing account balance information for a second account held by the user at the financial institution, wherein the funds are transmitted from the second account of the user held at the financial institution.

17. The system of claim 9, wherein the account is a credit card account held by the user, and wherein the mobile wallet circuit is further configured to:
receive a determination that the user has insufficient credit available to perform the transaction; and
provide the user with a link to pay off at least a portion of the balance for the credit card account.

18. The system of claim 9, wherein the account is a first account held by the user, wherein the screen display is a first screen display, and wherein the mobile wallet circuit is further configured to:
determine that the user has insufficient funds available in the first account to perform the transaction;
receive a second screen display to present to the user via the mobile device, the second screen display showing account balance information for each of a plurality of additional accounts held by the user at the financial institution; and
receive a user selection of one of the plurality of additional accounts, wherein the funds are transmitted from the second account of the user held at the financial institution.

19. The system of claim 9, wherein a second screen display is provided to the user, the second screen display comprising updated account balance information after the funds are transmitted to the recipient.

20. The system of claim 9,
wherein the mobile wallet circuit is further configured to transmit budget information configured by the user, wherein the screen display is a first screen display, and wherein the second screen display comprises the budget information configured by the user.

21. The system of claim 9, wherein the mobile wallet circuit is further configured to:

provide first rewards information regarding first rewards available to the user if the user uses a first account to perform the transaction;

provide second rewards information regarding second rewards available to the user if the user uses a second account to perform the transaction, wherein the first rewards are different from the second rewards; and wherein a second screen display comprising at least one of the first and second rewards information is provided to the user via the mobile device.

22. A non-transitory computer-readable medium comprising instructions that, when executed by a processor of a mobile device, cause the mobile device to perform a method, the method comprising:

generating a customer token that identifies a user of the mobile device, wherein the customer token is separate from a user provided login credential for a mobile wallet application on the mobile device;

generating a device token comprising encrypted device information that identifies the mobile device and a current mobile wallet application session of the user;

receiving the user provided login credential for the mobile wallet application;

accessing, via a server system, account balance information for an account held by a user at a financial institution;

transmitting the customer token, the device token, and the user provided login credential to the server system that verifies each for a mobile wallet transaction performed via the mobile wallet application;

receiving a payment token associated with the mobile wallet transaction performed via the mobile wallet application based on verification of the customer token, the device token, and the user provided login credential for the mobile wallet application;

receiving a screen display to present to the user, the screen display showing the account balance information for the account held by the user at the financial institution;

receiving, via the server system, a determination of rewards information regarding rewards available to the user if the user uses the account to perform the transaction, wherein the screen display comprises the rewards information;

prompting the user to purchase rewards for the mobile wallet transaction while at a physical point of sale associated with a merchant;

receiving an indication to purchase rewards for the mobile wallet transaction while at the physical point of sale associated with the merchant; and providing an indication regarding performance of the mobile wallet transaction with the merchant by showing a cost of the mobile wallet transaction after application of the purchased rewards.

23. The non-transitory computer-readable medium of claim 22, wherein the account is a demand deposit account, a credit card account, a savings account or a line of credit.

24. The non-transitory computer-readable medium of claim 22, wherein the indication regarding performance of the mobile wallet transaction is received via the same screen display upon which the account balance information is displayed, and wherein the indication is the last input received by the mobile device from the user prior to transmission of an account number from the mobile device to the merchant computer system.

25. The non-transitory computer-readable medium of claim 22, wherein the funds are transmitted from the account of the user held at the financial institution.

26. The non-transitory computer-readable medium of claim 22, wherein the account is a first account held by the user, wherein the screen display is a first screen display, and wherein the method further comprises: receiving a determination that the user has insufficient funds available in the first account to perform the transaction; and providing a second screen display to the user, the second screen display showing account balance information for a second account held by the user at the financial institution, wherein the funds are transmitted from the second account of the user held at the financial institution.

27. The non-transitory computer-readable medium of claim 22, wherein the account is a first account held by the user, wherein the screen display is a first screen display, and wherein the method further comprises: receiving a determination that the user has insufficient funds available in the first account to perform the transaction; providing a second screen display to the user, the second screen display showing account balance information for each of a plurality of additional accounts held by the user at the financial institution; and receiving a user selection of one of the plurality of additional accounts, wherein the funds are transmitted from the selected one of the plurality of additional accounts.

28. The non-transitory computer-readable medium of claim 22, wherein the screen display is a first screen display, and wherein the method further comprises receiving a second screen display to present to the user, the second screen display showing updated account balance information after the funds are transmitted to the recipient.

29. The non-transitory computer-readable medium of claim 22, wherein the mobile device is communicatively coupled to a computer system comprising budget information for the user, the budget information being configured by the user through an online banking area of a website of the financial institution; wherein the screen display is a first screen display; and wherein the method further comprises receiving a second screen display to present to the user via the mobile device, the second screen display showing the budget information configured by the user.

* * * * *